(12) United States Patent
Shohara

(10) Patent No.: US 8,345,127 B2
(45) Date of Patent: Jan. 1, 2013

(54) IMAGE PROCESSING APPARATUS AND METHOD OF PROCESSING IMAGE FOR REDUCING NOISE OF THE IMAGE

(75) Inventor: Makoto Shohara, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/528,389

(22) Filed: Jun. 20, 2012

(65) Prior Publication Data

US 2012/0257089 A1 Oct. 11, 2012

Related U.S. Application Data

(62) Division of application No. 12/558,283, filed on Sep. 11, 2009.

(30) Foreign Application Priority Data

Sep. 12, 2008 (JP) ................................. 2008-235593
Jul. 29, 2009 (JP) ................................. 2009-177031

(51) Int. Cl.
*H04N 5/217* (2011.01)
(52) U.S. Cl. ...................... 348/241; 348/222.1; 348/272
(58) Field of Classification Search ............... 348/222.1, 348/272, 273, 241; 382/260–266
See application file for complete search history.

(56) References Cited

U.S. PATENT DOCUMENTS

| 5,732,159 | A | * | 3/1998 | Jung | 382/262 |
| 6,633,683 | B1 | * | 10/2003 | Dinh et al. | 382/260 |
| 7,259,786 | B2 | * | 8/2007 | Shimizu | 348/231.6 |
| 2004/0119841 | A1 | * | 6/2004 | Shimizu | 348/222.1 |
| 2005/0063475 | A1 | * | 3/2005 | Bhaskaran | 375/240.29 |
| 2005/0094890 | A1 | * | 5/2005 | Wang | 382/266 |
| 2007/0296871 | A1 | * | 12/2007 | Yoo et al. | 348/701 |
| 2008/0181491 | A1 | * | 7/2008 | Bala et al. | 382/162 |
| 2008/0226191 | A1 | * | 9/2008 | Ohwaki et al. | 382/264 |
| 2009/0033773 | A1 | * | 2/2009 | Kinoshita et al. | 348/241 |

FOREIGN PATENT DOCUMENTS

| JP | 03193806 | A | * | 8/1991 |
| JP | 2001057677 | A | * | 2/2001 |
| JP | 2004128809 | A | * | 4/2004 |

OTHER PUBLICATIONS

Tian et al., Analysis of Temporal Noise in CMOS Photodiode Active Pixel Sensor, IEEE Journal of Solid-State Circuits, Jan. 2001, vol. 36, No. 1, pp. 92-101.*

Kim et al. Characterization and Improvement of Random Noise in 1/3.2: UXGA CMOS image sensor with 2.8um pixel using 0.13um-technology, Image solution,System LSI Division,Samsun Electronics Co., pp. 149-152, Jun. 2005.*

Lee, Digital enhancement and noise filtering by use of local statistics, IEEE Transactions on Pattern Analysis and Machine Intelligence, Mar. 1980, vol. PAMI-2, No. 2, pp. 165-168.*

* cited by examiner

*Primary Examiner* — Nelson D. Hernández Hernández
(74) *Attorney, Agent, or Firm* — Canon USA, Inc., I.P. Division

(57) ABSTRACT

An image processing apparatus calculates a smoothed value obtained by smoothing signal levels of a plurality of pixels including a processing target pixel in a local area of an input image and a feature amount representing an edge degree of the processing target pixel using a pre-noise reduction image obtained by reducing an impulse noise of the input image. The image processing apparatus weighted-adds a signal level of the processing target pixel and the smoothed value at a ratio corresponding to the feature amount and outputs the weighted-addition result as a signal level after noise reduction processing.

8 Claims, 23 Drawing Sheets

FIG.13

| 1 | 2 | 1 |
|---|---|---|
| 2 | 4 | 2 |
| 1 | 2 | 1 |

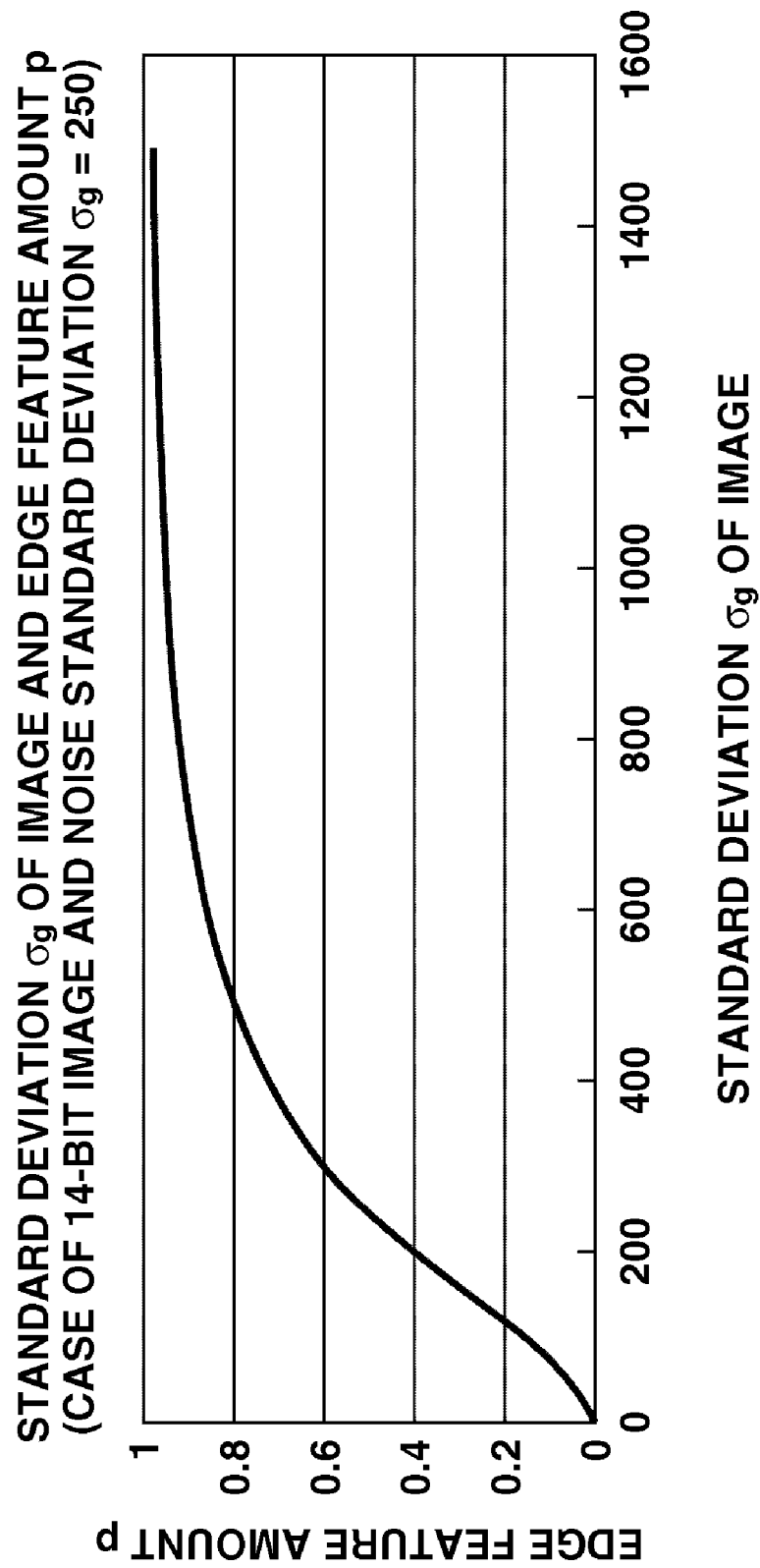

IMAGE PROCESSING APPARATUS AND METHOD OF PROCESSING IMAGE FOR REDUCING NOISE OF THE IMAGE

CROSS REFERENCE OF RELATED APPLICATIONS

This application is a Divisional of U.S. patent application Ser. No. 12/558,283 filed on Sep. 11, 2009 which claims the benefit of Japanese Patent Application No. 2008-235593 filed Sep. 12, 2008 and Japanese Patent Application No. 2009-177031 filed Jul. 29, 2009, which are hereby incorporated by reference herein in their entirety.

BACKGROUND OF THE INVENTION

1. Field of the Invention

The present invention relates to an image processing apparatus and a method of processing an image, and more particularly, to an image processing apparatus and a method of processing an image to reduce noise of the image.

2. Description of the Related Art

As an image noise reduction method with an edge preservation effect, Lee's method (see J. S. LEE, "Digital enhancement and noise filtering by use of local statistics", IEEE Transactions on Pattern Analysis and Machine Intelligence, PAMI-2, pp. 165-168, 1980) has been known. In this method, a variance of signal levels of pixels of an image in which pixels are arrayed in XY directions is calculated, and noise reduction is performed based on the variance, as expressed in Equations (1) and (2).

$$r(x, y) = (1 - p(x, y)) \cdot E(g(x, y)) + (px, y) \cdot g(x, y) \quad (1)$$

$$p(x, y) = \frac{\sigma_g^2(x, y)}{\sigma_g^2(x, y) + \sigma_n^2(x, y)} \quad (2)$$

In Equation (1), $g(x,y)$ denotes the signal level of a pixel positioned at coordinates $(x,y)$ of an image. $E(g(x,y))$ denotes a mean value of signal levels of pixels in a local area centering on the coordinates $(x,y)$. In particular, $E(g(x,y))$ is a mean value of signal levels of pixels positioned within a range of 5 pixels×5 pixels which centers on the pixel of the coordinates $(x,y)$. In Equation (2), $\sigma_g^2(x,y)$ denotes a variance of signal levels of pixels in a local area which centers on the pixel of the coordinates $(x,y)$. In particular, $\sigma_g^2(x,y)$ denotes a variance of signal levels of pixels positioned within a range of 5 pixels×5 pixels which centers on the pixel of the coordinates $(x,y)$. $\sigma_n^2(x,y)$ denotes a variance of a noise level included in a signal level of a pixel positioned within a range of 5 pixels×5 pixels centering on a pixel of coordinates $(x,y)$.

An edge feature amount $p(x,y)$ denotes an edge degree of the pixel positioned at the coordinates $(x,y)$. The feature amount $p(x,y)$ has a value ranging from 0 to 1 inclusive. As apparent from Equation (2), as the noise variance value $\sigma^2_{,}(x,y)$ which is previously measured increases, the feature amount $p(x,y)$ decreases, and as the local variance value $\sigma_g^2(x,y)$ increases, the feature amount $p(x,y)$ increases. Therefore, as can be seen from Equation (1), as the noise variance $\sigma_n^2(x,y)$ increases, a ratio which the local mean value $E(g(x,y))$ occupies in the signal level $r(x,y)$ after noise reduction to the original signal level $g(x,y)$ increases. On the other hand, as the local variance $\sigma_g^2(x,y)$ increases, a ratio which the local mean value $E(g(x,y))$ occupies in the signal level $r(x,y)$ after noise reduction to the original signal level $g(x,y)$ decreases.

In an edge part of an image, the local variance value $\sigma_g^2(x,y)$ of an image increases. Therefore, in an edge part of an image, the value of the edge feature amount $p(x,y)$ approaches "1", and a ratio which the original signal level $g(x,y)$ occupies in the signal level $r(x,y)$ after noise reduction increases. As a result, in an edge part of an image, it is possible to prevent an edge of the original signal level from being blunt by the local mean value $E(g(x,y))$.

Meanwhile, an image in which a noise of an impulse form such as a bright spot noise, a dark spot noise, or a random telegraph signal (RTS) noise is present due to a defective pixel has the large local variance value $\sigma_g^2(x,y)$ and so is likely to be determined as an edge part. Therefore, at positions in which the noises are generated, the value of the feature amount $p(x,y)$ increases, and a noise reduction effect is reduced.

FIG. 23 illustrates a relationship between the edge feature amount $p(x,y)$ and a standard deviation $\sigma_g(x,y)$ of an image. FIG. 23 illustrates an example when the standard deviation $\sigma_n(x,y)$ of a noise is 250 in an image of a 14-bit pixel, in which the horizontal axis denotes the standard deviation $\sigma_n(x,y)$ of a noise, and the vertical axis denotes the edge feature amount $p(x,y)$.

A median filter is commonly used to remove an impulse noise. However, when the median filter is used, a high frequency part of an image is distorted, so that detail information of an image is lost. It is known that a photoelectric conversion element used as a digital camera image sensor causes a low frequency noise such as a thermal noise or a 1/f noise which occurs in an amplifying circuit as well as a dark current noise and an optical shot noise which occur at the time of photoelectric conversion (for example, see H. Tian, B. Fowler, and A. E. Gamal, "Analysis of temporal noise in cmos photodiode active pixel sensor", IEEE J. Solid State Circuits, vol. 36. Jan. pp. 92-101, 2001).

Of these noises, in particular, values of a dark current noise and an optical shot noise depend on a signal level, and thus a variance value $\sigma_n^2(x,y)$ of the noises also depends on a signal level. It is known that with the recent miniaturization of a pixel, in particular, in a complementary metal oxide semiconductor (CMOS) image sensor, a low frequency noise called a random telegraph signal (RTS) noise generated by a reading transistor of a pixel causes a noise of a white spot form in an image (for example, J. Y. Kim, et al., "Characterization and Improvement of Random Noise in 1/3.2" UXGA CMOS Image Sensor with 2.8 um Pixel Using 0.13 um-technology", IEEE Workshop on CCD and AIS, p. 149, 2005).

In the case of a noise of a high level or a noise which is spatially expanded like a thermal noise of a digital camera, it is effective to perform noise reduction processing as in Equations (1) and (2) described above using a large size kernel (referred to as M×N pixels). However, when a kernel size is large, there is a problem in that a calculation amount increases. To cope with this problem, a technique of using an image which has a plurality of different resolutions (for example, see Japanese Patent No. 3193806 or Japanese Patent No. 3995854) has been suggested.

It is well known that an image file format generated by a digital camera is greatly divided into two. One is a universal file format such as Joint Photographic Experts Group (JPEG) or Tagged Image File Format (TIFF), which is recorded after so-called development processing is performed within a digital camera. The other is a device-dependent file format called RAW format, in which an output of an image sensor is recorded as is.

The RAW format has an advantage of being capable of obtaining a result of changing various parameters (such as an exposure value and a white balance value) without deteriorating an image quality (for example, see Japanese Patent Application Laid-Open No. 2004-128809).

In recent years, a digital camera has a trend that as the number of pixels of an image sensor increases, a pixel is miniaturized, and as the sensitivity of an image sensor increases, a noise caused by the sensor increases. In a digital camera, since a noise is generated for various causes, image processing on a signal in which various noise characteristics are reflected is performed. As a pixel is miniaturized, a noise of a pulse form is generated. To remove a noise of an impulse form through processing using Equations (1) and (2) described above, it is necessary to increase a noise removal level. However, when a noise removal level increases, there is a problem in that a high frequency component of an image may be lost, and an edge may become blurred.

SUMMARY OF THE INVENTION

The present invention is directed to an image processing apparatus capable of effectively reducing a noise of an image.

According to an aspect of the present invention, an image processing apparatus includes a noise reduction unit configured to generate a pre-noise reduction image obtained by reducing an impulse noise of an input image, a smoothing unit configured to calculate a smoothed value obtained by smoothing signal levels of a plurality of pixels including a processing target pixel in a local area of the input image, a feature amount calculation unit configured to calculate a feature amount representing an edge degree of the processing target pixel using the pre-noise reduction image, and an addition unit configured to weighted-add a signal level of the processing target pixel and the smoothed value at a ratio corresponding to the feature amount and to output the weighted addition result as a signal level after noise reduction processing of the input image, wherein the addition unit performs the weighted addition such that as a pixel has a feature amount that represents a higher edge degree, a ratio of the smoothed value decreases.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 illustrates an example of a spatial low pass filter.

FIG. 23 illustrates a relationship between an edge feature amount $p(x,y)$ and a standard deviation $\sigma_g(x,y)$ of an image.

DESCRIPTION OF THE EMBODIMENTS

Various exemplary embodiments, features, and aspects of the invention will be described in detail below with reference to the drawings.

Figure 1:
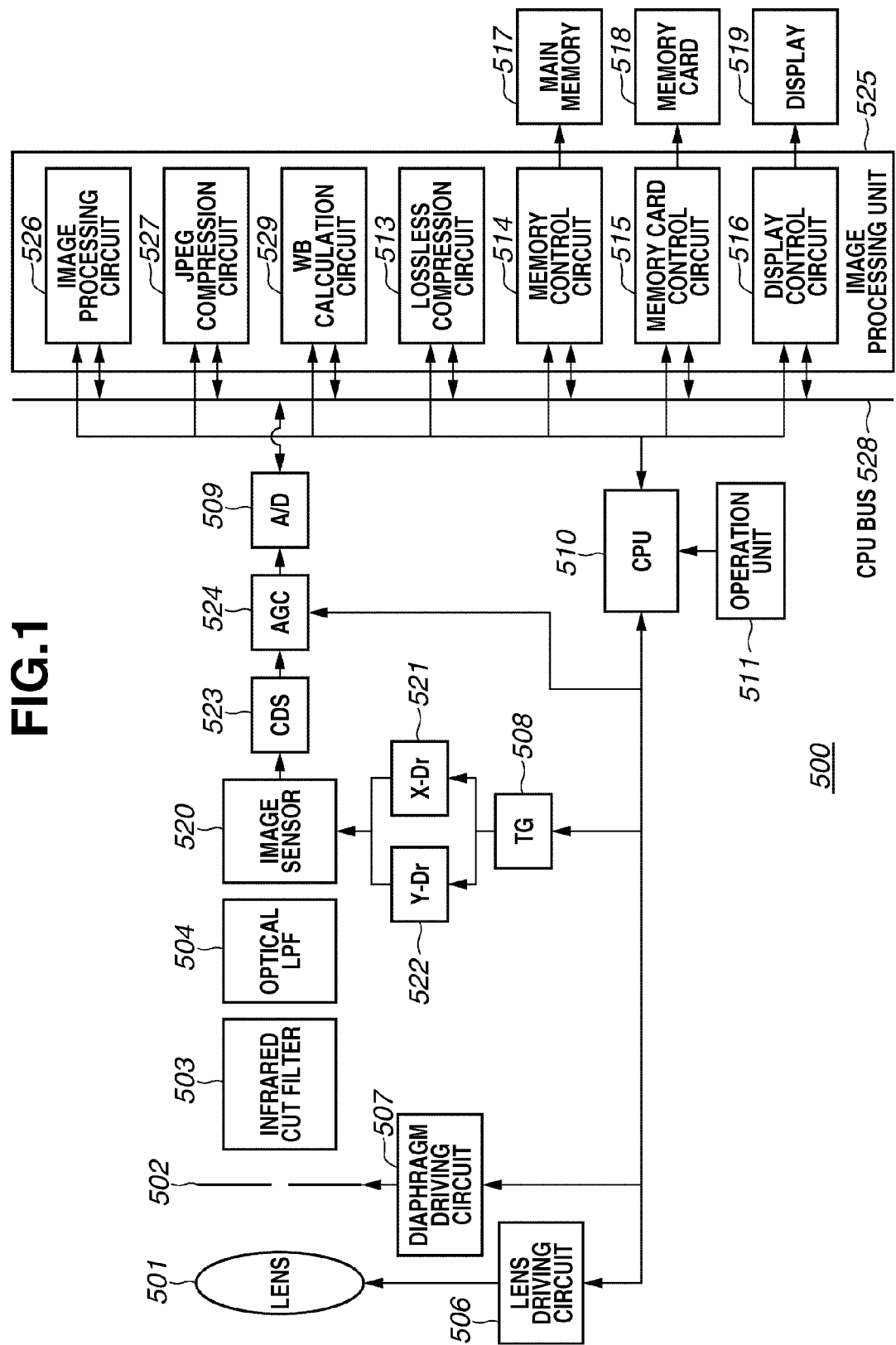
FIG. 1 is a block diagram illustrating an example configuration of a digital camera which generates image data processed by an image processing apparatus according to a first exemplary embodiment of the present invention.

FIG. 1 is a block diagram illustrating an example configuration of a digital camera 500 which generates image data processed by an image processing apparatus according to a first exemplary embodiment of the present invention. The present exemplary embodiment is described focusing on a lens-integrated digital camera, but the present exemplary embodiment may be applied to a lens-interchangeable digital camera.

Object light incident from a lens 501 passes through a diaphragm 502, an infrared cut filter 503, and an optical low pass filter (LPF) 504 and forms an image on a light receiving surface of an image sensor 520. FIG. 1 schematically illustrates one lens as the lens 501, but a plurality of lenses including a focusing lens which can be driven by a lens driving circuit 506 is actually disposed. The diaphragm 502 is driven by a diaphragm driving circuit 507. A mechanical shutter may be used as the diaphragm 502. In the present exemplary embodiment, the image sensor 520 includes a charge-coupled device (CCD) image sensor or a complementary metal oxide semiconductor (CMOS) image sensor, and in the present exemplary embodiment, it is assumed that a CMOS image sensor is used as the image sensor 520.

A plurality of photoelectric conversion elements (pixels) using a photodiode is disposed on the light receiving surface of the image sensor 520. An original color filter of a Bayer array which includes, for example, read (R), green (G), and blue (B) is disposed on an optical LPF side surface of the photoelectric conversion elements such that one color corresponds to one photoelectric conversion element. The digital camera 500 of the present exemplary embodiment is of a single plate type in which a single image sensor and a single color filter are used, but may have a configuration with a plurality of image sensors such as a three-plate type in which three groups of color filters and image sensors for R, G, and B are used.

A object image formed on the image sensor 520 is converted into charges of an amount corresponding to an incident light amount through each photoelectric conversion element. A signal generated by a timing generator (TG) 508 is supplied to a horizontal reference pulse generating driver (X-Dr) 521 and a vertical reference pulse generating driver (Y-Dr) 522. A reading pixel of the image sensor 520 is selected by the horizontal reference pulse generating driver 521 and the vertical reference pulse generating driver 522, and charges accumulated in the photoelectric conversion element of the selected pixel are converted into a voltage signal, so that the voltage signal is output from the image sensor 520.

The voltage signal output from the image sensor 520 is sampled through a correlated double sampling circuit (CDS) 523, amplified through an automatic gain control circuit (AGC) according to set international organization for standardization (ISO) sensitivity, and converted to a digital signal through an analog-to-digital converter (A/D) 509.

The digital signal (RAW image data) output from the A/D 509 is input to an image processing unit 525 and stored in a main memory 517 controlled by a memory control circuit 514 after a white balance gain is calculated by a WB calculation circuit 529.

Further, the RAW image data output from the A/D 509 is lossless compressed through a lossless compression circuit 513 which performs lossless compression, supplied to a memory card control circuit 515 through a central processing unit (CPU) bus 528, and stored in a memory card 518 as an image file in RAW format.

The RAW image data output from the A/D 509 is also input to an image processing circuit 526, converted from RGB format to YCbCr format, raster-block-converted, and compressed or encoded into JPEG format through a JPEG compression circuit 527. Image data in JPEG format output from the JPEG compression circuit 527 is supplied to the memory card control circuit 515 through the CPU bus 528 and stored in the memory card 518 as a JPEG format file. The JPEG format file is read out to a display control circuit 516, changed in size, and displayed on a display 519 as an image.

A CPU 510 executes a program stored in an internal memory to control the whole digital camera 500. An operation unit 511 is a switch configured to transfer an instruction of a user to the CPU 510 and includes a release button or an arrow key.

Image processing performed through the image processing circuit 526 will be described below in detail.

Figure 2:
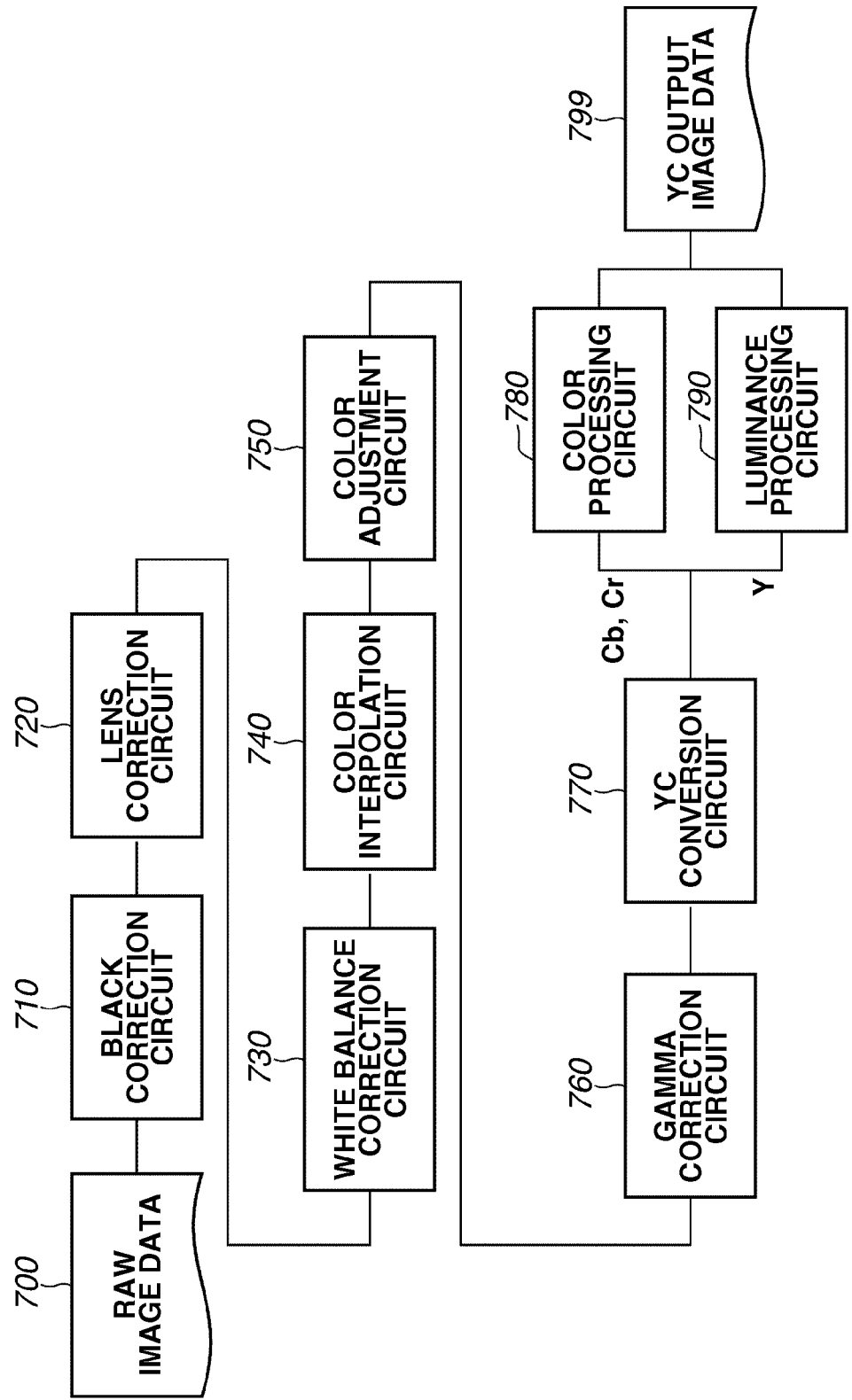
FIG. 2 is a block diagram schematically illustrating image processing of an image processing circuit.

FIG. 2 is a block diagram schematically illustrating image processing of the image processing circuit 526. RAW image data 700 input from the main memory 517 is input to a black correction circuit 710. The black correction circuit 710 approximately estimates a black float caused by a dark current from an integrated mean value of image data in a coordinate area of a light shielding part (an optical black (OB) part) of the image sensor 520 and subtracts the integrated mean value from image data. Image data which is black-corrected through the black correction circuit 710 is input to a lens correction circuit 720.

The lens correction circuit 720 corrects optical characteristics of the lens 501, particularly, light falloff at edges and chromatic aberration of magnification which are generated in the lens 501. Light falloff at edges may be corrected by amplifying signal levels of pixels in a peripheral area, and chromatic aberration of magnification may be corrected by scaling an image in an image height direction for each color to comply with a reference color.

The image data corrected through the lens correction circuit 720 is input to a white balance correction circuit 730. The white balance correction circuit 730 applies a white balance gain, which is previously calculated in the WB calculation circuit 529 of the image processing unit 525, to the image data. Alternatively, the white balance correction circuit 730 applies a white balance gain for a light source (for example, daylight, a tungsten lamp, or a fluorescent lamp), which is previously set to the image data. The image data white-balance-corrected through the white balance correction circuit 730 is color-interpolated through a color interpolation circuit 740. The color interpolation circuit 740 obtains color information, which is insufficient in each pixel, through interpolation according to a color array of a color filter formed in the image sensor 520.

Figure 3:
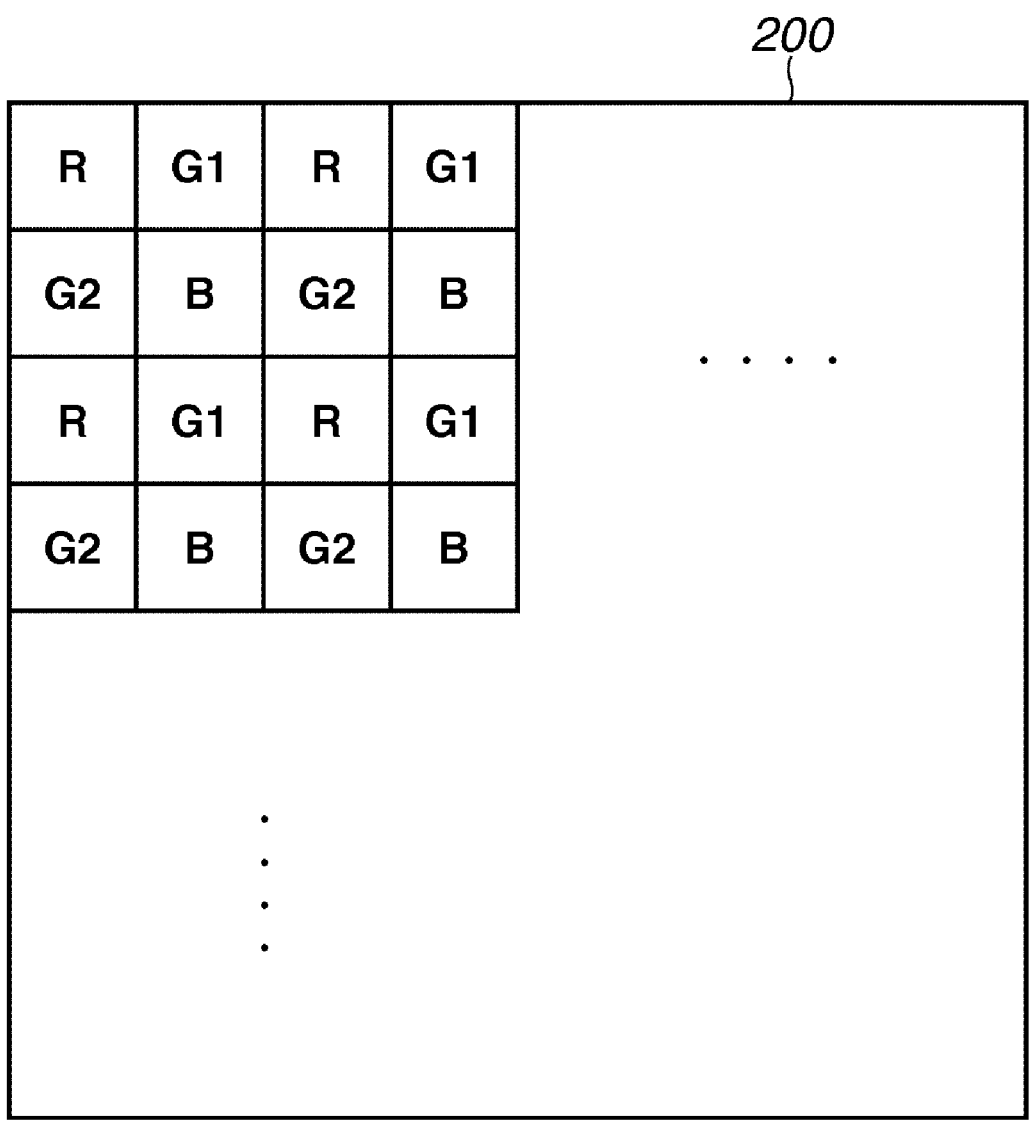
FIG. 3 illustrates an example of a Bayer array of a color filter.

For example, as illustrated in FIG. 3, a color filter 200 of a Bayer array in which R-, G-, and B-pixels are disposed in a lattice form is used. In this case, the color interpolation circuit 740 obtains information of G and B for an R pixel, information of R and B for a G pixel, and information of R and G for a B pixel from neighboring pixels through interpolation.

As a result, three planes of R, G and B for generating a color image are obtained.

Next, a color adjustment circuit 750 performs color optimization for the image data with three planes of R, G, and B through, for example, 3×3 matrix calculation as in Equation (3).

$$Rc = m11 \times R + m12 \times G + m13 \times B$$

$$Gc = m21 \times R + m22 \times G + m23 \times B$$

$$Bc = m31 \times R + m32 \times G + m33 \times B \quad (3)$$

In Equation (3), m11 to m33 denote optimization coefficients.

A gamma (γ) correction circuit 780 performs gamma correction for the image data (Rc, Gc, and Bc) after color adjustment as in Equation (4).

$$R\gamma=\gamma(Rc)$$

$$G\gamma=\gamma(Gc)$$

$$B\gamma=\gamma(Bc) \quad (4)$$

A YC conversion circuit 770 converts the gamma-converted image data ($R\gamma$, $G\gamma$, and $B\gamma$) from R, G, and B signals to signals of a luminance component and a color difference component such as YCbCr as in Equation (5) to perform false color suppression processing or edge emphasis processing.

$$Y=k11\times R\gamma+k12\times G\gamma+k13\times B\gamma$$

$$Cb=k21\times R\gamma+k22\times G\gamma+k23\times B\gamma$$

$$Cr=k31\times R\gamma+k32\times G\gamma+k33\times B\gamma \quad (5)$$

In Equation (5), k11 to k33 denote conversion coefficients.

In the case of generating image data in JPEG format, a luminance processing circuit 790 applies edge emphasis processing to a luminance component Y of a signal converted to YCbCr format. A color processing circuit 780 applies false color suppression processing to a color difference component CbCr. In particular, a median filter is applied to the color difference component CbCr to remove an isolated point. A JPEG compression circuit 527 encodes YC output image data 799 in YCbCr format in which edge emphasis processing and false color suppression processing have been applied into JPEG format.

Figure 4:
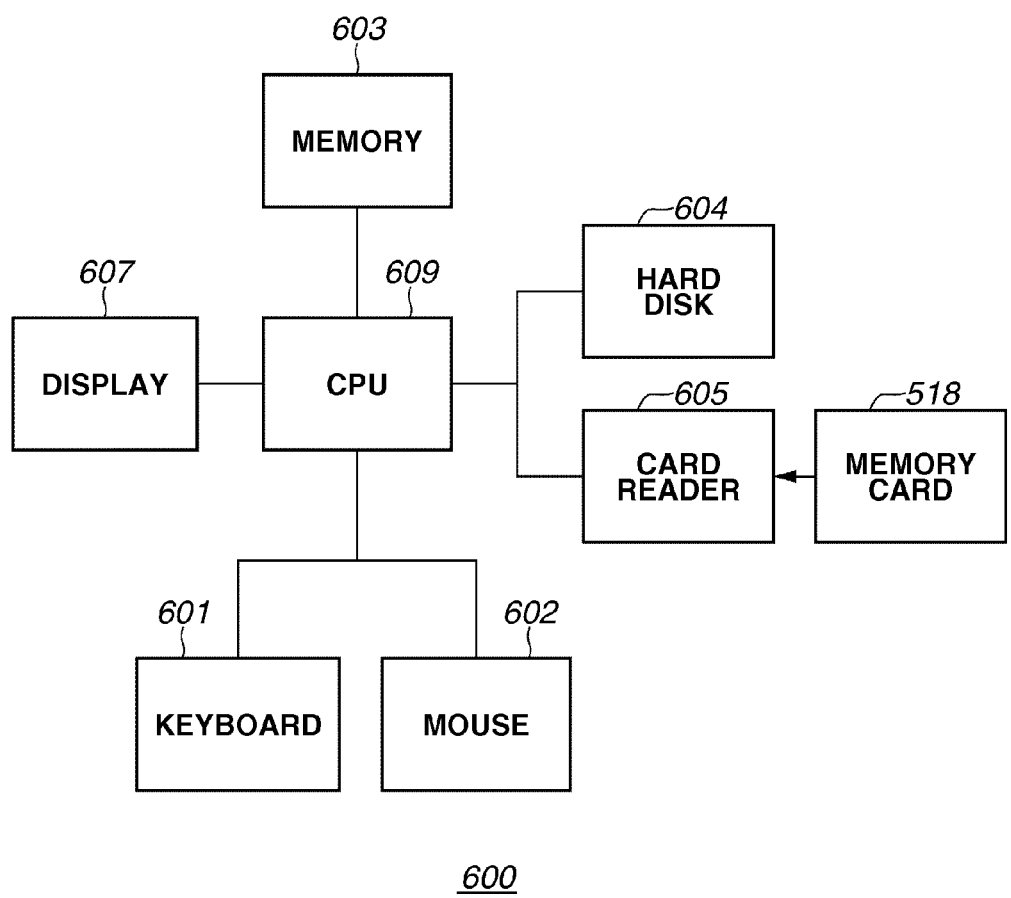
FIG. 4 is a block diagram illustrating a configuration of an information processing apparatus as one example of the image processing apparatus according to the first exemplary embodiment of the present invention.

FIG. 4 is a block diagram illustrating a configuration of an information processing apparatus as an example of an image processing apparatus according to the first exemplary embodiment of the present invention.

A general personal computer may be used as the information processing apparatus 600. In FIG. 4, a CPU 609 executes a program stored in a memory 603 to implement each processing including image processing.

A hard disk 604 stores essential software (operating system (OS)) or application programs of the information processing apparatus 600, and programs are read from the hard disk 604 into the memory 603 and executed by the CPU 609.

A display 607 performs various display operations under control of the CPU 609. A user of the information processing apparatus 600 operates the information processing apparatus 600 using an input device such as a keyboard 601 or a mouse 602. A card reader 605 may read the memory card 518, which is removable from the digital camera 500, and load an image file in RAW format or JPEG format, which is recorded in the memory card 518, to the memory 603 or the hard disk 604.

Hereinafter, it is assumed that an image processing application which operates in the information processing apparatus 600 processes an image file in RAW format generated by the digital camera 500 through software. However, a part or all of image processing may be implemented through hardware.

Figure 5:
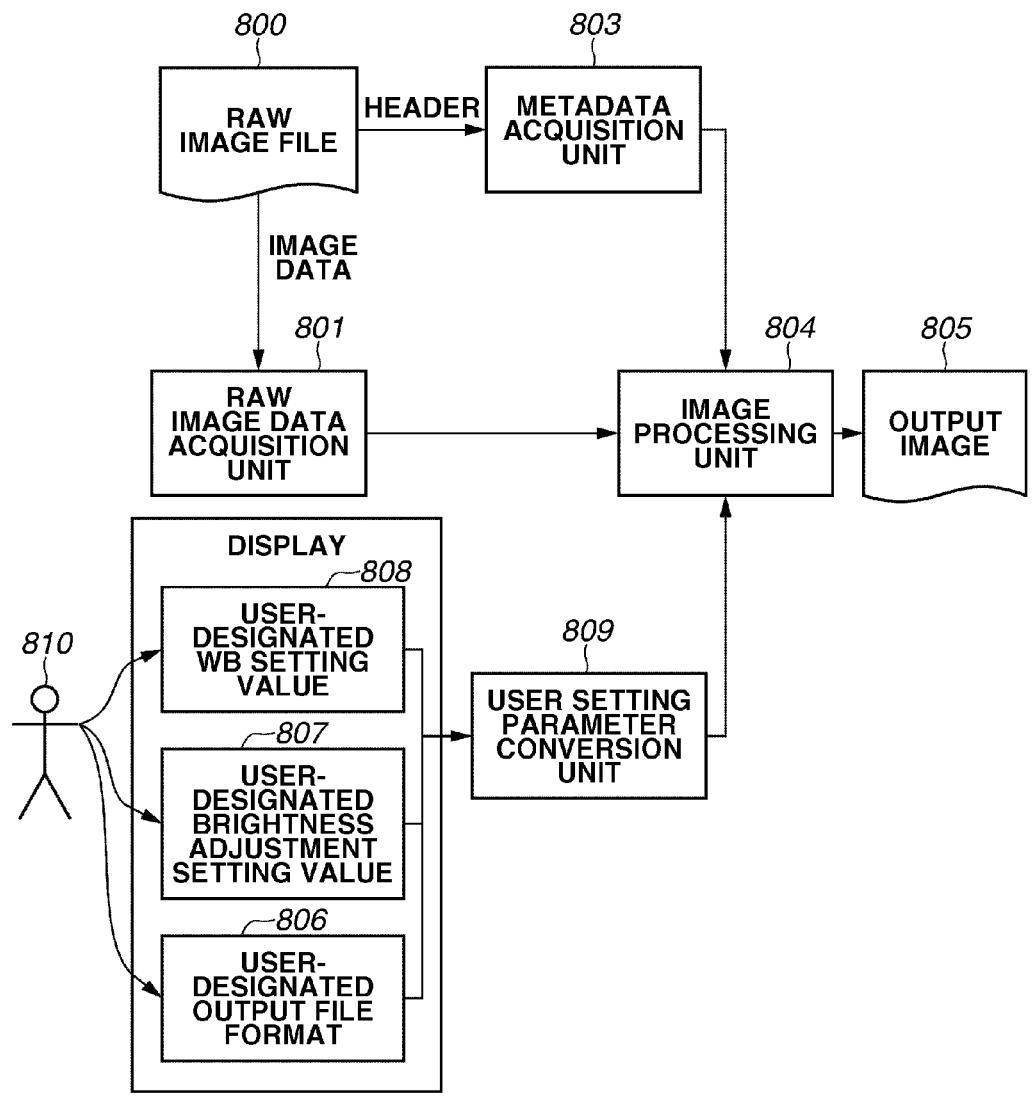
FIG. 5 schematically illustrates image processing performed in the information processing apparatus of FIG. 4 through functional blocks.
Figure 6:
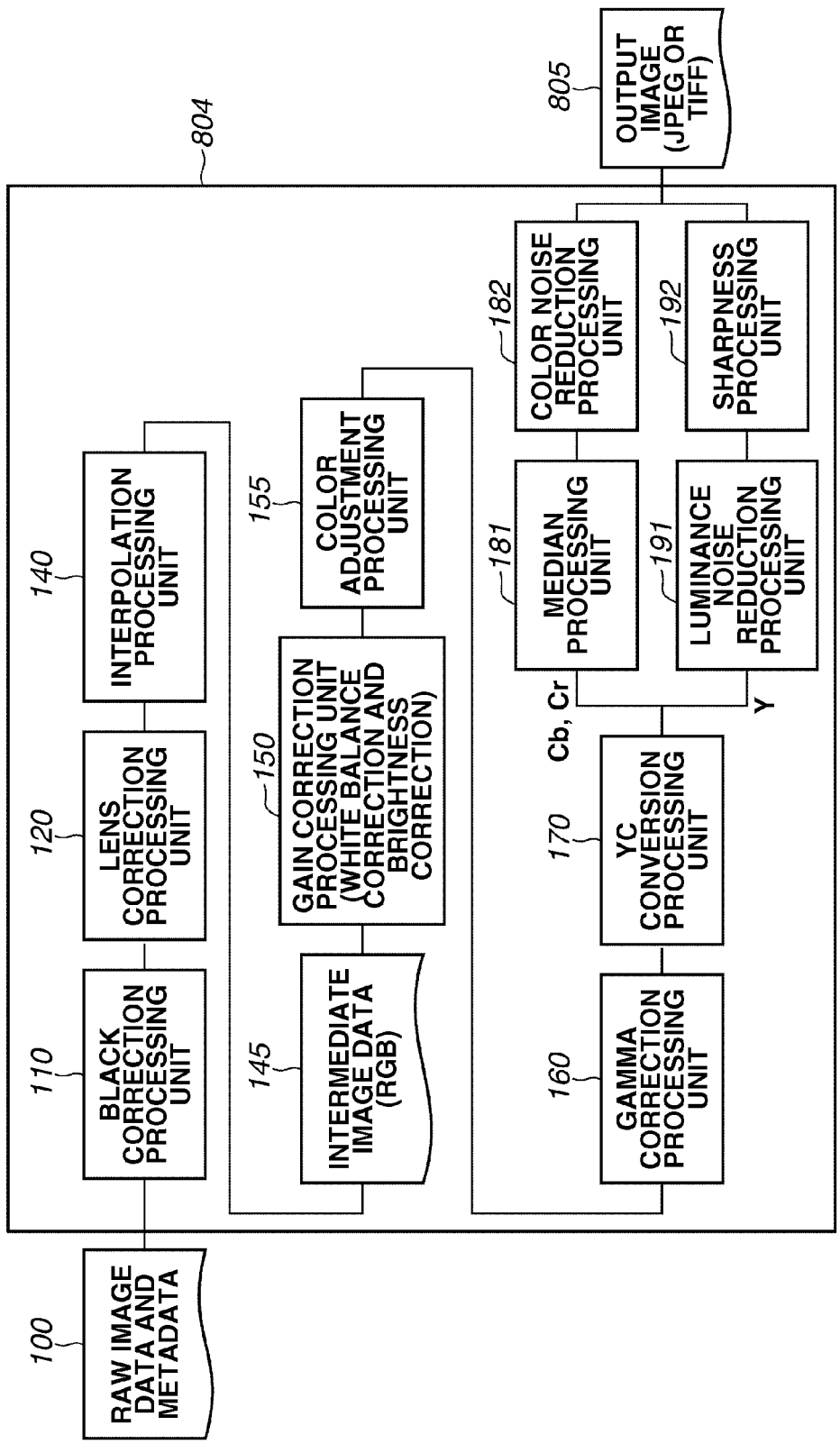
FIG. 6 schematically illustrates the flow of image processing performed by an image processing unit of FIG. 5.

FIG. 5 schematically illustrates image processing performed in the information processing apparatus 600 through functional blocks. FIG. 6 schematically illustrates the flow of image processing performed by an image processing unit 804 of FIG. 5 (an image processing application performed by the information processing apparatus 600).

RAW image data acquired from a RAW image file 800 through a RAW image data acquisition unit 801 and metadata acquired through the a metadata acquisition unit 803 are input to a black correction processing unit 110 of the image processing unit 804. The black correction processing unit 110 acquires black image data, which is an integrated mean value of image data in a coordinate area of a light shielding part (an OB part) of the image sensor 520, from metadata and subtracts the integrated mean value from the image data. The image data which is black-corrected through the black correction processing unit 110 is input to a lens correction processing unit 120.

The lens correction processing unit 120 corrects optical characteristics of the lens 501 which is used when a RAW image is picked up, particularly, light falloff at edges and chromatic aberration of magnification which are generated in the lens 501.

Black image data and lens information (or a correction value) which are necessary for processing of the black correction processing unit 110 and the lens correction processing unit 120 are included in a header of a RAW image file as metadata. The metadata includes a shooting condition (such as an ISO sensitivity, an aperture value, and a shutter speed), information about image processing (such as a white balance coefficient and a $\gamma$ curve), and information specific to an image pickup apparatus (such as color array information of a color filter) in addition to the black image data and the lens information. The metadata is acquired from a RAW image file through the metadata acquisition unit 803 and transferred to the image processing unit 804.

The image data corrected by the lens correction processing unit 120 is input to an interpolation processing unit 140 to be color-interpolated. The color interpolation processing unit 140 obtains color information, which is insufficient in each pixel, through interpolation according to a color array of a color filter installed in the image sensor 520. Information about a color array of a color filter is also included in a RAW image file.

For example, as illustrated in FIG. 3, a color filter of a Bayer array in which R-, G-, and B-pixels are disposed in a lattice form is used. The color interpolation processing unit 140 obtains information of G and B for an R pixel, information of R and B for a G pixel, and information of R and G for a B pixel from neighboring pixels through interpolation. As a result, three planes of R, G, and B for generating a color image are obtained, and image data with three planes of R, G, and B is then stored in the memory 603 as intermediate image data 145.

Processing so far may be performed regardless of an image processing setting value, which is designated by a user 810 of an image processing application, such as a user-designated white balance setting value 808 or a user-designated brightness adjustment setting value 807. Processing, which depends on the image processing setting value designated by the user 810, is performed based on intermediate image data 145 stored in the memory 603, and so a part of necessary image processing may be omitted to reflect a user setting value.

The intermediate image data 145 stored in the memory 603 is input to a gain correction processing unit 150. The gain correction processing unit 150 performs white balance correction and brightness adjustment processing.

A user setting parameter conversion unit 809 converts the user-designated white balance setting value 808 designated by the user 810 to gain values (wbR, wbG, and wbB) of R, G, and B colors which are used in the gain correction processing unit 150. The user setting parameter conversion unit 809 converts the user-designated brightness adjustment setting value 807 to a gain value (brightGain), which is common in R, G, and B colors, which is used in the gain correction processing unit 150. Gain values (gainR, gainG, and gainB) of R, G, and B colors are obtained as in Equation (6). The gains are multiplied by R, G, and B components of image data, respectively, as in Equation (7).

$$gainR = WbR \times brightGain$$

$$gainG = WbG \times brightGain$$

$$gainB = WbB \times brightGain \quad (6)$$

$$RWb = gainR \times R$$

$$GWb = gainG \times G$$

$$BWb = gainB \times B \quad (7)$$

A color adjustment processing unit 155 performs color optimization for the image data which includes Rwb, Gwb, and Bwb which are gain-corrected, through matrix calculation of 3 pixels×3 pixels as in Equation (3) to generate image data which includes Rc, Gc, and Bc. A gamma correction processing unit 160 performs gamma conversion for the image data (Rc, Gc, and Bc) after color adjustment.

An YC conversion processing unit 170 converts the image data which is gamma-converted from an RGB signal into a signal of a luminance component and a color difference component such as YCbCr as in Equation (5) to perform false color suppression processing or edge emphasis processing.

A luminance noise reduction processing unit 191 suppresses a rough noise of the luminance component Y of the YCbCr-converted signal, and thereafter a sharpness processing unit 192 applies edge emphasis to the luminance component Y of the signal which is YCbCr-converted. A median processing unit 181 applies a median filter to the color difference component CbCr of the YCbCr-converted signal to suppress false color, and a color noise reduction processing unit 182 makes an area in which a color balance is locally non-uniform homogenized. The image data in YCbCr format in which edge emphasis processing and false color suppression processing have been performed is subjected to conversion processing for an output file format according to a user-designated output file format 806, so that an output image 805 is output. The output file format includes, for example, JPEG format or TIFF format.

Processing of the luminance noise reduction processing unit 191 will be described below in detail.

Figure 7:
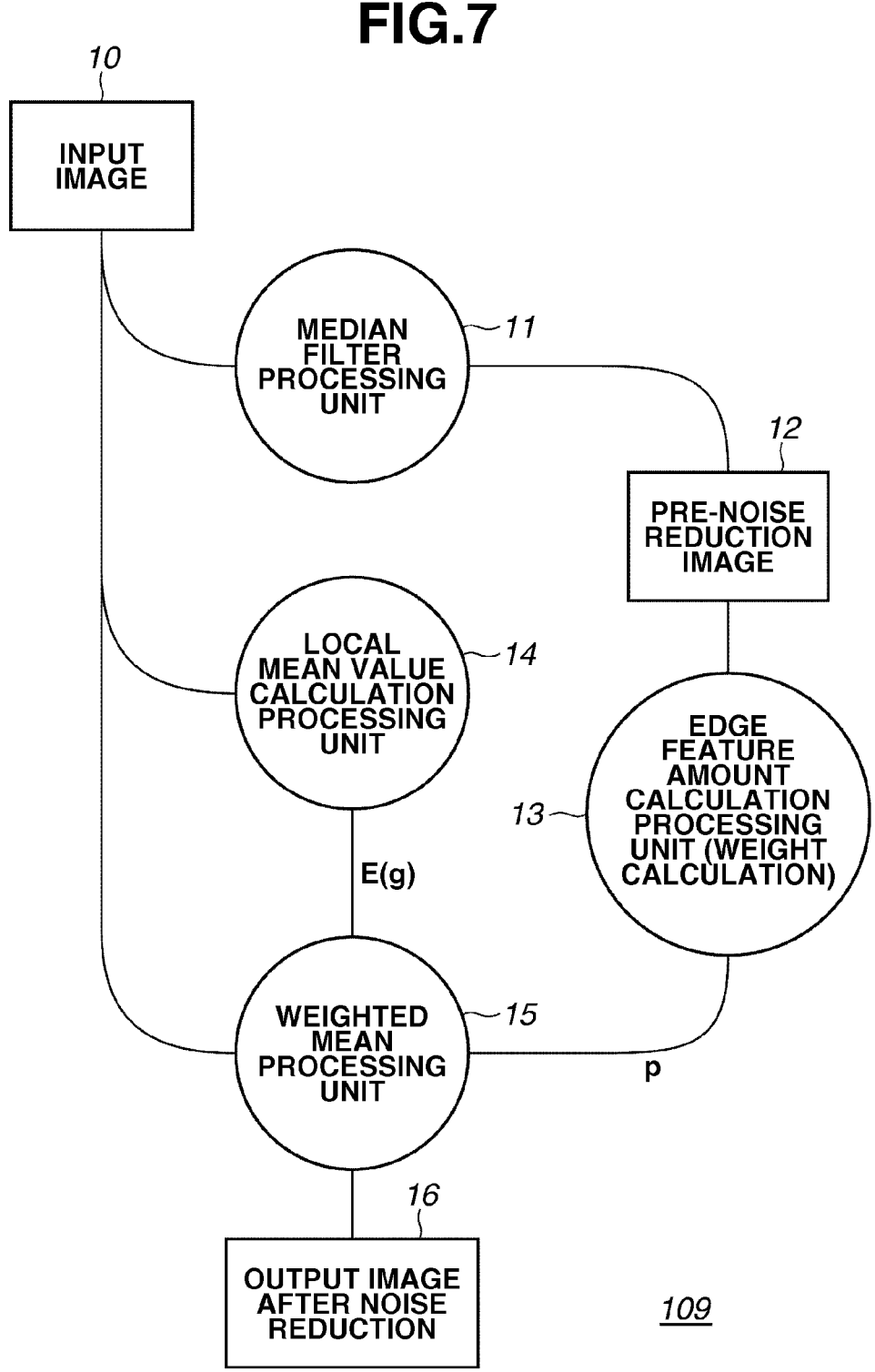
FIG. 7 illustrates the internal processing flow of a luminance noise reduction processing unit of FIG. 6.

FIG. 7 illustrates the internal processing flow of the luminance noise reduction processing unit 191.

In luminance noise reduction processing, a luminance component Y of image data is used as an input image 10. A median filter processing unit 11 applies a median filter of a 3×3 tap to an area which centers on a pixel of coordinates (x,y) which is a processing target of the input image 10 to generate a pre-noise reduction image 12 in which a noise of an impulse form caused by an RTS noise or a defective pixel is removed. Alternatively, a difference between a signal level g(x,y) of a pixel of coordinates (x,y) which is a processing target and a signal level of a neighboring pixel is obtained, and when differences with all neighboring pixels exceed a threshold value, g(x,y) may be replaced with a mean value of signal levels of the neighboring pixels.

An edge feature amount calculation processing unit 13 calculates a local edge feature amount p(x,y) which centers on a pixel of coordinates (x,y) which is a processing target, using signal levels of pixels disposed within a range of 3 pixels×3 pixels which centers on a processing target pixel. Here, an area in which the edge feature amount p(x,y) is calculated has a range of 3 pixels×pixels which centers a processing target pixel, but the size of the area may be changed to, for example, 5 pixels×5 pixels or 7 pixels×7 pixels according to the size of an image or a noise reduction degree. As the size of the area is changed, the number of taps of the median filter, the size of an area for calculating a variance value of a noise, or a variance value of a local signal level needs to be changed. The edge feature amount p(x,y) has a value ranging from 0 to 1 inclusive to represent an edge degree and has a larger value as an edge degree is higher. The edge feature amount p(x,y) is calculated from an image in which a noise of an impulse form is suppressed by a median filter in advance, and thus a problem in that a noise of an impulse form is determined as an edge area can be inhibited.

The edge feature amount calculation processing unit 13 calculates the edge feature amount p for each processing target pixel using Equation (2), which is the same as in Lee's method described above as related art. Lee's method performs both calculation of the edge feature amount p(x,y) which centers on coordinates (x,y) and calculation of the mean value E (g(x,y)) of a local area which centers on a pixel of coordinates (x,y) to an original image to which a median filter is not applied. On the other hand, in the present exemplary embodiment, the edge feature amount processing unit 13 uses the pre-noise reduction image 12 in which a noise of an impulse form caused by a RTS noise or a defective pixel is removed, and a local mean value calculation processing unit 14 uses an original input image 10 other than the pre-noise reduction image 12.

In the present exemplary embodiment, the edge feature amount p(x,y) may be calculated using a signal level u(x,y) of a pixel, positioned at coordinates (x,y), of an image after pre-noise reduction as in Equation (8).

$$p(x, y) = \frac{\sigma_u^2(x, y)}{\sigma_u^2(x, y) + \sigma_n^2(x, y)} \quad (8)$$

In Equation (8), $\sigma_n^2(x,y)$ denotes a variance value of noises included in signal levels of pixels within a local area which centers on a pixel of coordinates (x,y) of the pre-noise reduction image. $\sigma_u^2(x,y)$ denotes a variance value of signal levels of pixels within a local area which centers on a pixel of coordinates (x,y) of the pre-noise reduction image. The noise variance value $\sigma_n^2(x,y)$ is a value which depends on the type of a camera, an ISO sensitivity, and a luminance level, and may be a value which is previously measured and prepared. The noise variance value $\sigma_n^2(x,y)$ may be a value which does not depend on coordinates (x,y) but depends on only an ISO sensitivity and a luminance level.

Figure 8:
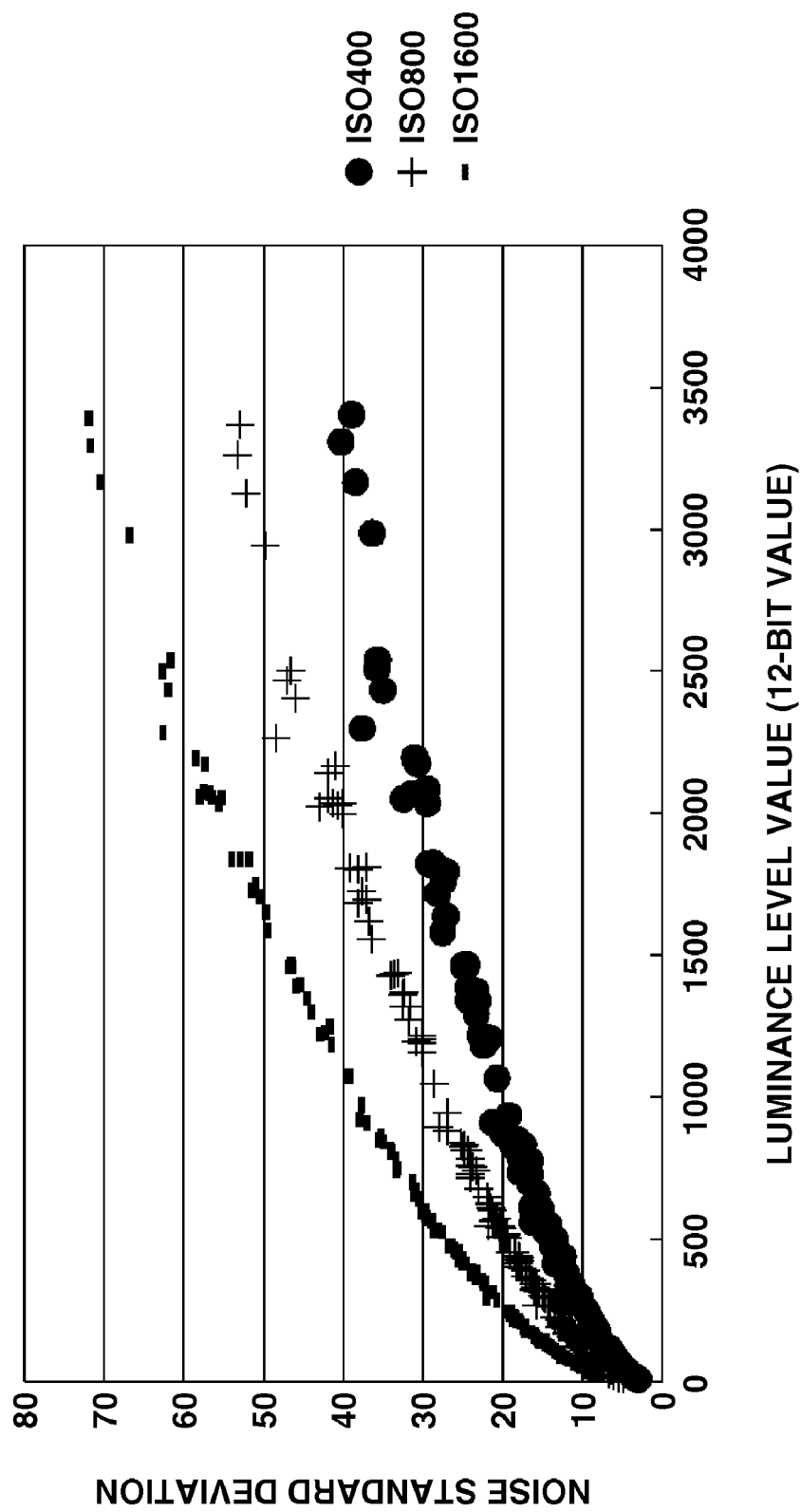
FIG. 8 illustrates an example of a noise standard deviation of a luminance level previously measured in a flat portion of an image from a pre-noise reduction image with respect to a plurality of ISO sensitivities.

FIG. 8 illustrates an example of a noise standard deviation (a noise variance value to the power of ½) of a luminance level previously measured in a flat portion of an image from the pre-noise reduction image 12 with respect to a plurality of ISO sensitivities. That is, the noise variance value is changed according to the ISO sensitivity.

The local variance value $\sigma_u^2(x,y)$ of the pre-noise reduction image is a variance value of signal levels of pixels within a local area of 5 pixels×5 pixels which centers on a pixel of coordinates (x,y) as expressed in Equation (9). In Equation (9), m(x,y) is a mean value of signal levels of pixels within a local area of 5 pixels×5 pixels which centers on a pixel of coordinates (x,y) and can be expressed as in Equation (10).

$$\sigma_u^2(x, y) = \frac{\sum_{i=-2}^{2} \sum_{j=-2}^{2} (u(x+i, y+j) - m)^2}{25} \quad (9)$$

$$m(x, y) = \frac{\sum_{i=-2}^{2} \sum_{j=-2}^{2} u(x+i, y+j)}{25} \tag{10}$$

Figure 9:
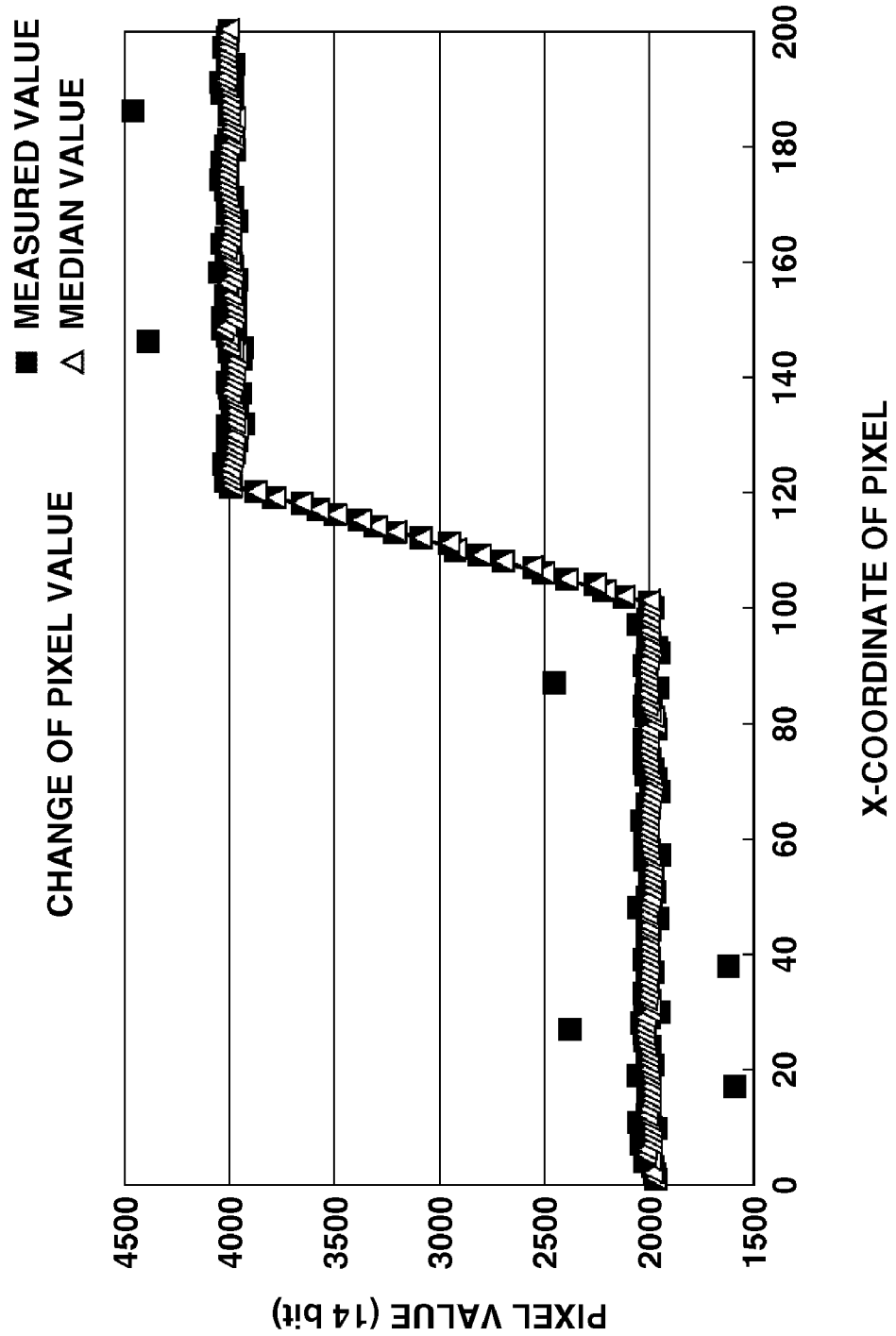
FIG. 9 illustrates an example in which a change of a signal level in an edge part of an image is simulated.

FIG. 9 illustrates an example in which a change of a signal level in an edge part of an image is simulated, and a Gaussian noise and a noise of an impulse form are added to an assumed noise. A noise of an impulse form is seen nearby x coordinates of 20, 30, 40, 90, 150, and 190.

Figure 10:
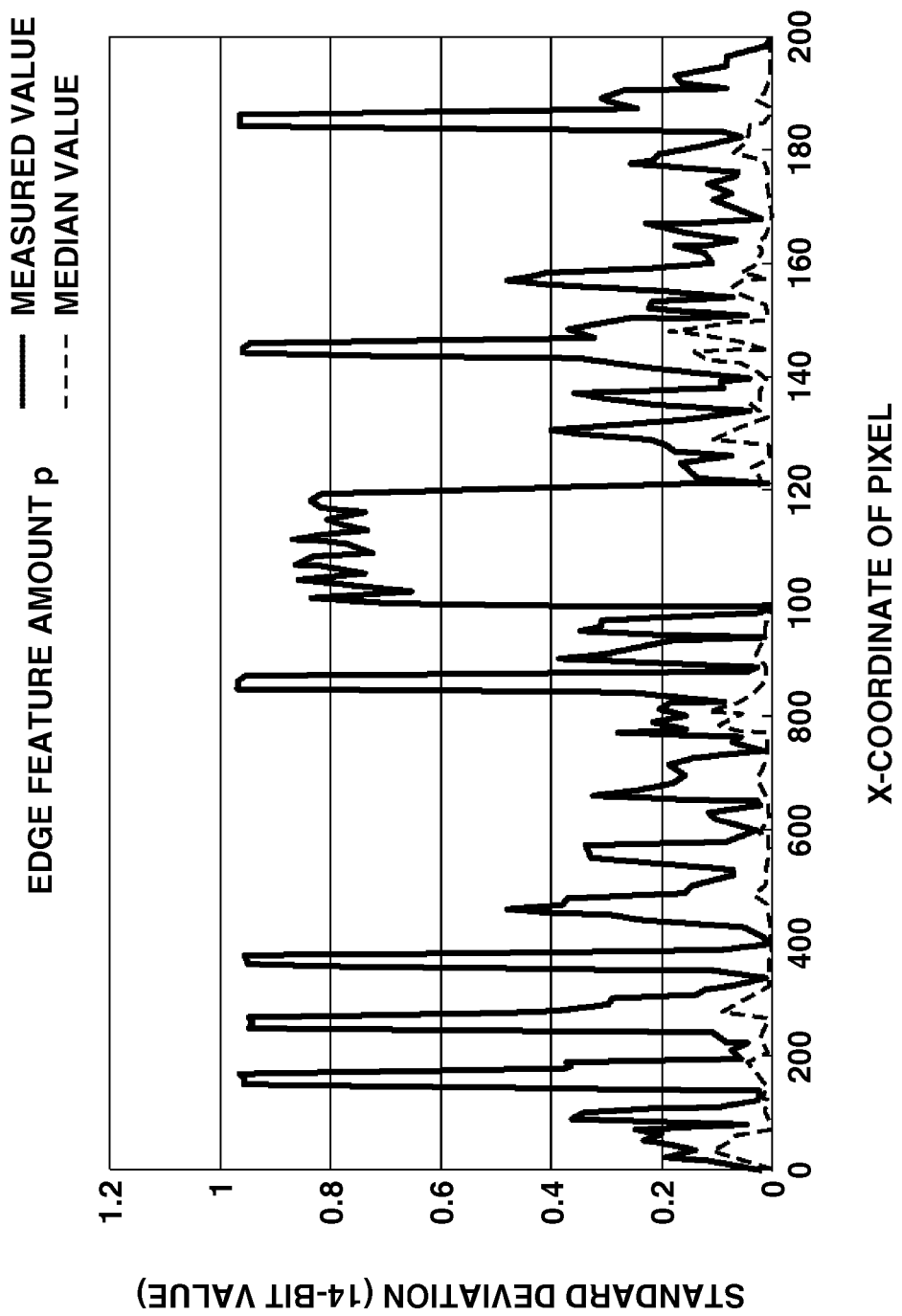
FIG. 10 illustrates a result of calculating an edge feature amount p for an edge part of an image illustrated in FIG. 9.

FIG. 10 illustrates a result of calculating the edge feature amount p for an edge part of an image illustrated in FIG. 9.

It can be understood from FIG. 10 that in Lee's method in which both calculation of the edge feature amount p(x,y) and calculation of the local mean value E(g(x,y)) are performed on the original image to which the median filter is not applied, a value of the feature amount p(x,y) approaches 1 in a noise part of an impulse form. It can be understood from Equation (1) that when the feature amount p approaches 1, an original signal level, that is, a signal level which is generating a noise in this case, is almost identical to a signal level after noise reduction. On the other hand, it can be understood that in a method of the present exemplary embodiment in which the edge feature amount is obtained from the pre-noise reduction image (a median value), the feature amount p(x,y) in a noise part of an impulse form approaches 0, and an impulse noise can be reduced.

The local mean value calculation processing unit 14 of FIG. 7 calculates a mean value ave25 of signal levels of pixels of 5 pixels×5 pixels which center on a pixel of coordinates (x,y) from an input image 10 as in Equation (11). The local mean value calculation processing unit 14 calculates a mean value ave9 of signal levels of pixels of 3 pixels×3 pixels which center on a pixel of coordinates (x,y) as in Equation (12).

$$ave25 = \frac{\sum_{i=-2}^{2} \sum_{j=-2}^{2} g(x+i, y+j)}{25} \tag{11}$$

$$ave9 = \frac{\sum_{i=-1}^{1} \sum_{j=-1}^{1} g(x+i, y+j)}{9} \tag{12}$$

A weighted mean processing unit 15 of FIG. 7 performs a weighted addition of the local mean value E(g(x,y)) which centers a pixel of coordinates (x,y) of the input image 10 and a signal level g(x,y) of a pixel of coordinates (x,y) of the input image 10 according to a value of the edge feature amount p(x,y) obtained through the edge feature amount processing unit 13. An obtained value r(x,y) is used as a signal level of an output image 16 after noise reduction.

In particular, the weighted mean processing unit 15 first calculates the local mean value E(g(x,y)) which centers a pixel of coordinates (x,y) of the input image 10 as in Equation (13).

$$E(g(x,y)) = f(p(x,y)) \cdot ave25 + (1 - f(p(x,y))) \cdot ave9 \tag{13}$$

In Equation (13), f(p(x,y)) is a function of the edge feature amount p(x,y). As the edge feature amount p(x,y) increases, a weight of ave9 which is a mean value in which the number of taps is small increases, while the edge feature amount p(x,y) decreases, a weight of ave25 which is a mean value in which the number of taps is large increases.

Such weighting may be realized by calculating f(p(x,y)) as, for example, in Equation (14).

$$f(p(x,y)) = (1 - p(x,y))^8 \tag{14}$$

Next, the weighted mean processing unit 15 calculates the signal level r(x,y) after noise reduction of a pixel of coordinates (x,y) using the edge feature amount p(x,y) as in Equation (15).

$$r(x,y) = (1 - p(x,y)) \cdot E(g(x,y)) + (p_{x,y}) \cdot g(x,y) \tag{15}$$

As apparent from Equation (15), in the case of the large edge feature amount p(x,y), that is, in the case of a pixel at a position having a high possibility that will be an edge part, the signal level r(x,y) of the output image 16 after noise reduction of a pixel of coordinates (x,y) becomes a value close to the original signal level g(x,y). On the other hand, in the case of the small edge feature amount p(x,y), that is, in the case of a pixel at a position having a high possibility that will be a flat portion, the signal level r after noise reduction of a pixel of coordinates (x,y) becomes a value close to the local mean value E(g(x,y)).

Figure 11:
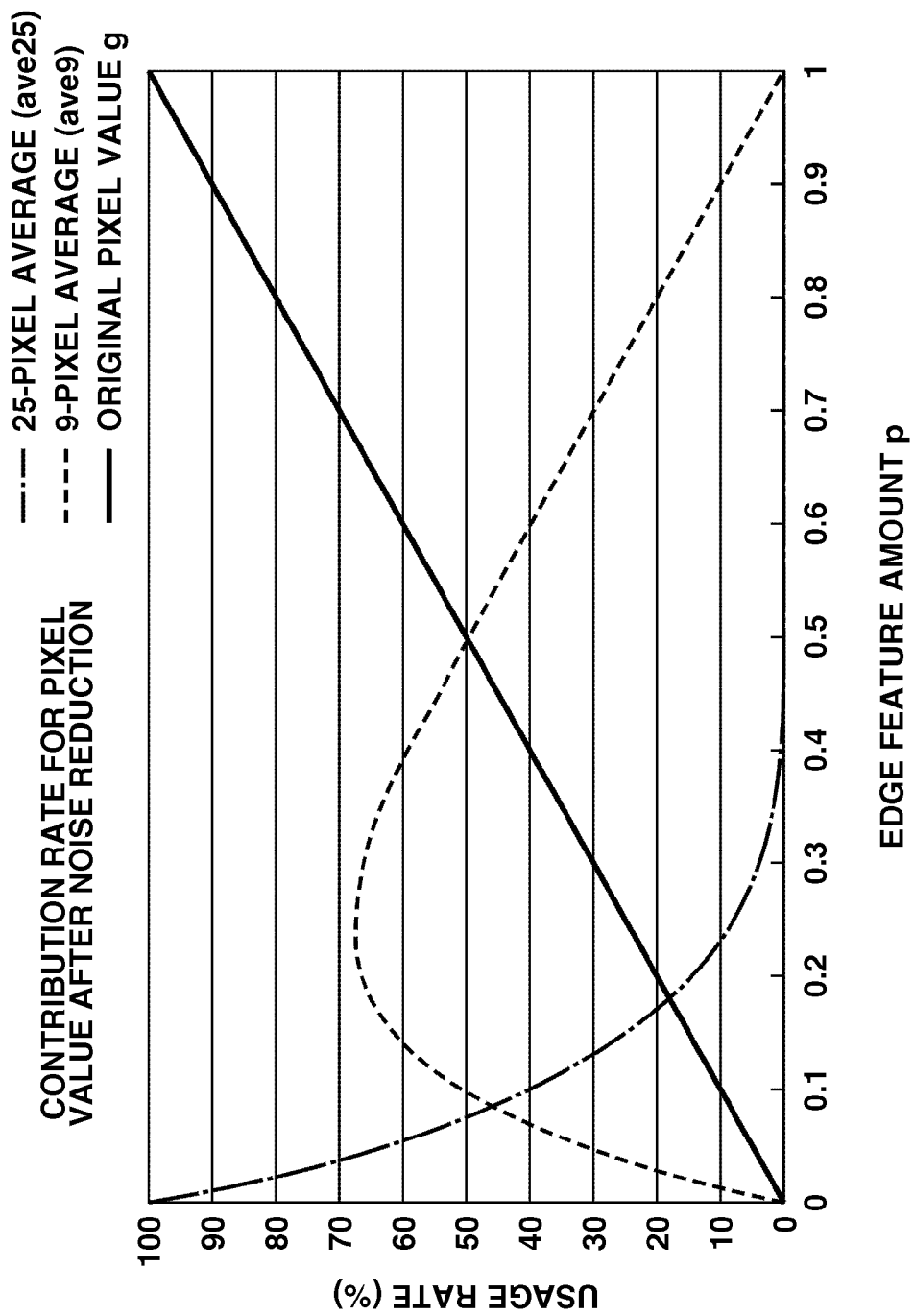
FIG. 11 illustrates a ratio relationship between a value of an edge feature amount p and signal levels (an original signal level g (x,y), a 9-pixel average ave9, and a 25-pixel average ave25) which contribute to a signal level r after noise reduction.

FIG. 11 illustrates a ratio relationship between a value of the edge feature amount p(x,y) and signal levels (the original signal level g(x,y), the mean value ave9 of 9 pixels, and the mean value ave25 of 25 pixels) which contribute to the signal level r(x,y) after noise reduction.

It can be understood from FIG. 11 that when a weighted addition is performed as in Equations (13) and (14), in an area which has the edge feature amount p(x,y) of 0 to about 0.1 and which is closer to a flat portion, a contribution of the ave25 of 25-pixel average is dominant, and a signal level becomes flat.

As described above, in the present exemplary embodiment, an original signal level of a pixel which is a processing target and a mean value of signal levels of a local area which centers on the pixel are weighted-added according to an edge feature amount of the image to thereby reduce a noise of the image. The edge feature amount is calculated using an image in which a noise of an impulse form is removed, while the local mean value is calculated using an original image in which a noise of an impulse form is not removed. As a result, a noise of an impulse form generated in an image due to miniaturization of a pixel as well as a noise which is present in an overall image can be effectively reduced while inhibiting a loss of a high frequency component of an image.

To calculate the signal level r(x,y) after noise reduction, the original signal level g(x,y) and the local mean value E(g(x,y)) are weighted-added, but the present invention is not limited it. Instead of the local mean value E(g(x,y)) which centers on a processing target pixel of coordinates (x,y), a value in which a signal level of a processing target pixel of coordinates (x,y) and a signal level of a neighboring pixel are weighted-added to smooth the signal level of the processing target pixel may be used. That is, not limited to the mean value E(g(x,y)), a signal level in which the original signal level g(x,y) is smoothed and so a high frequency component is further suppressed than the original signal level g(x,y) may be used for calculation of the signal level r(x,y) after noise reduction.

Next, a second exemplary embodiment of the present invention will be described.

In the present exemplary embodiment, luminance noise reduction processing described in the first exemplary embodiment is applied to multi-resolution processing. In the present exemplary embodiment, luminance noise reduction processing is implemented such that the CPU 609 of the information processing apparatus 600 executes an image processing application as in the first exemplary embodiment. In the present exemplary embodiment, only a processing content of the luminance noise reduction processing unit 191 illustrated in FIG. 6 is different from that in the first exemplary embodiment, and thus the present exemplary embodiment will be described focusing on a processing content of the luminance noise reduction processing unit 191.

Figure 12:
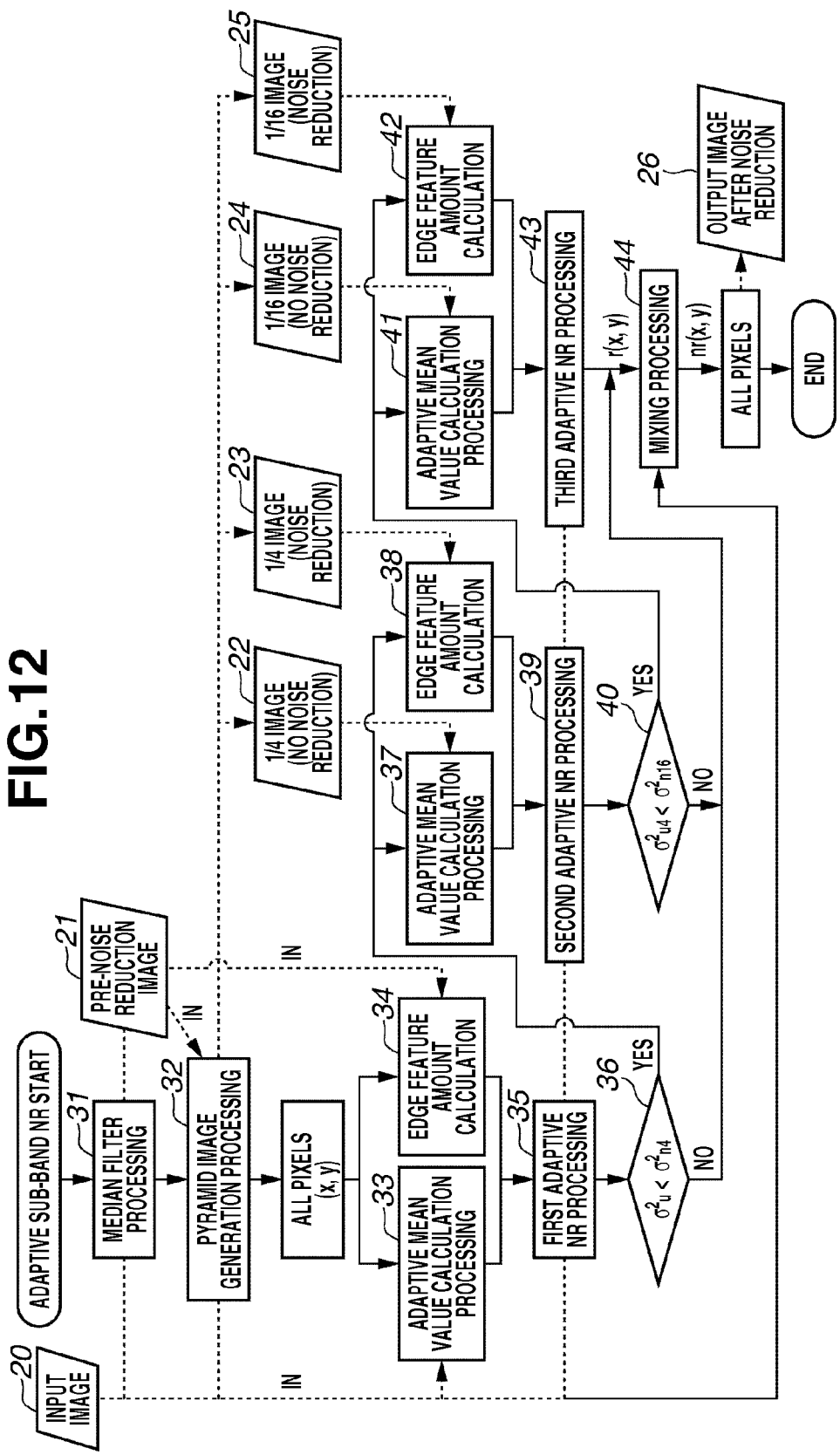
FIG. 12 illustrates a processing content and flow of a luminance noise reduction processing unit of an image processing apparatus according to a second exemplary embodiment of the present invention.

FIG. 12 illustrates the processing content and flow of the luminance noise reduction processing unit 191 according to the present exemplary embodiment. The luminance noise reduction processing unit 191 receives luminance image data output from the YC conversion processing unit 170 as an input image 20 and generates a pre-noise reduction image 21 in which a noise of an impulse form caused by a RTS noise or a defective pixel is removed through median filter processing 31. As described in the first exemplary embodiment, when a difference with a neighboring pixel is a threshold value or more, a signal level of a processing target pixel may be replaced with a value calculated from a signal level of a neighboring pixel.

Figure 13:
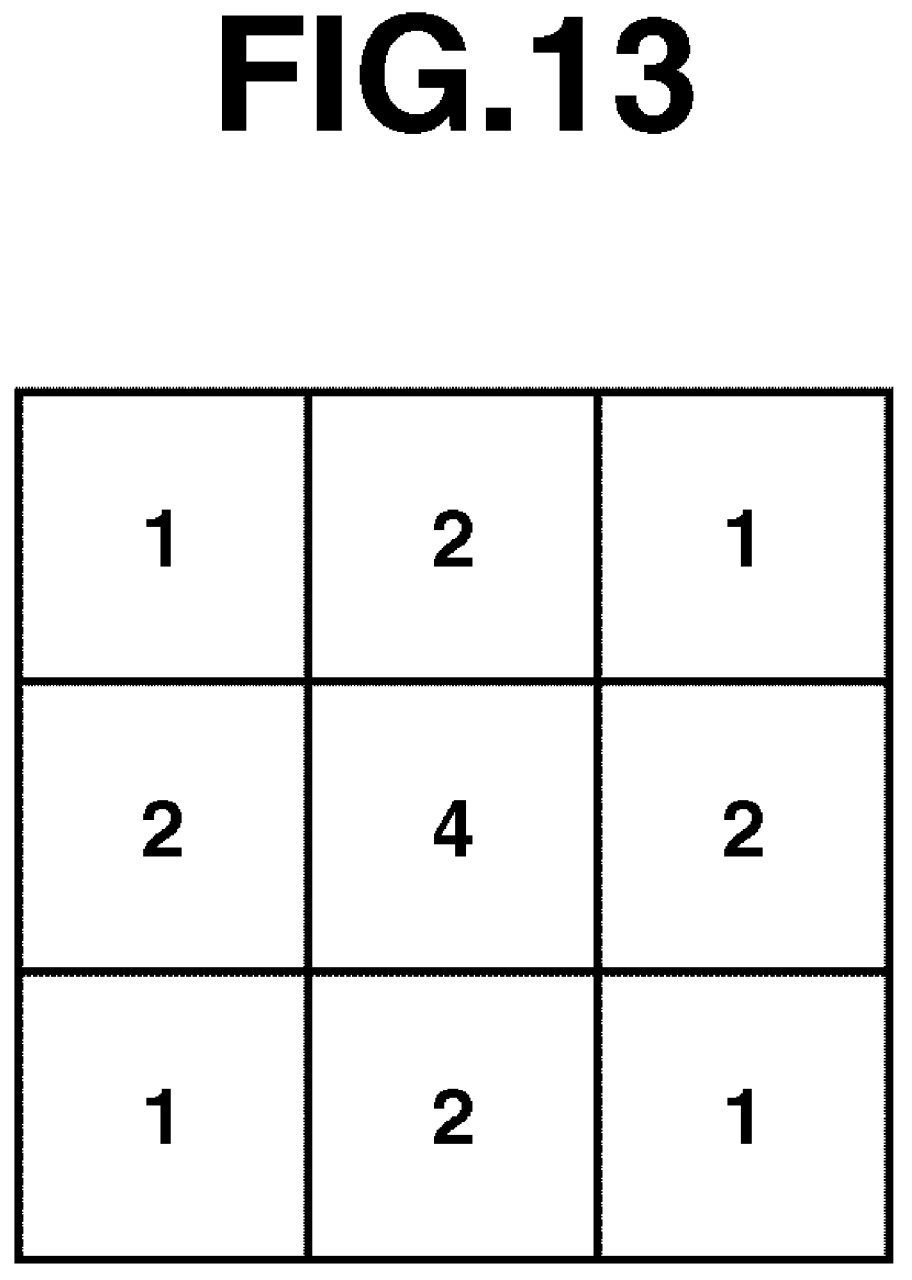

Next, in pyramid image generation processing 32, a spatial low pass filter is applied to the input image 20 as illustrated in FIG. 13, and then sub sampling into pixels of horizontal ½ by vertical ½ is performed to generate a ¼ reduced image 22. Further, in pyramid image generation processing 32, the reduced image 22 is further sub-sampled to pixels of horizontal ½ by vertical ½ to generate a 1/16 reduced image 24.

In pyramid image generation processing 32, the same sub sampling is applied to the pre-noise reduction image 21, which is generated through the median filter processing 31, to generate a ¼ reduced image 23 and a 1/16 reduced image 25 of the pre-noise reduction image.

After the reduced images 22 to 25 are generated through pyramid image generation processing 32, two types of pixel averages ave9 and ave25 are calculated using the input image 20 in adaptive mean value calculation processing 33 as in Equations (11) and (12).

Further, in edge feature amount calculation processing 34, an edge feature amount p(x,y) of a pixel of coordinates (x,y) for the pre-noise reduction image 21 is calculated as in Equation (8).

Thereafter, in first adaptive noise reduction (NR) processing 35, a signal level r(x,y) of a pixel of coordinates (x,y) after noise reduction for a non-reduced image is calculated using Equations (13), (14), and (15). Next, in determination processing 36, a local variance value $\sigma^2_u(x,y)$ for a pixel of coordinates (x,y) of the pre-noise reduction image 21 obtained in edge feature amount calculation processing 34 and a noise variance value $\sigma^2_{n4}(x,y)$ for the ¼ reduced image 23 of the pre-noise reduction image 21 are compared with each other. As the noise variance value of the ¼ reduced image 23, a value that is previously measured for each ISO sensitivity can be used as illustrated in FIG. 8. The noise variance value $\sigma^2_{n4}(x,y)$ may be a value that does not depend on coordinates (x,y) but depends on only the ISO sensitivity.

The luminance noise reduction processing unit 191 determines that there is a high possibility that the coordinates (x,y) correspond to an edge part when the local variance value $\sigma^2_u(x,y)$ is a threshold value $\sigma^2_{n4}(x,y)$ or more. In this case, the luminance noise reduction processing unit 191 does not perform processing for the ¼ reduced image but immediately performs mixing processing 44. However, when the local variance value $\sigma^2_u(x,y)$ is smaller than the threshold value $\sigma^2_{n4}(x,y)$, the luminance noise reduction processing unit 191 determines that there is a high possibility that the coordinates (x,y) correspond to a flat portion. This is because it is determined that a ratio which a frequency noise component which remains in the ¼ reduced image 22 of the input image 20 occupies in the signal level of the local area of the pre-noise reduction image 21 is high. In this case, the luminance noise reduction processing unit 191 performs adaptive mean value calculation processing 37 using the ¼ reduced image 22 of the input image 20 and edge feature amount calculation processing 38 using the ¼ reduced image 23 of the pre-noise reduction image 21.

In adaptive mean value calculation processing 37, two types of pixel averages ave9 and ave25 are calculated using the ¼ reduced image 22 of the input image 20 as in Equations (11) and (12).

Further, in edge feature amount calculation processing 38, an edge feature amount p(x,y) for the ¼ reduced image 23 of the pre-noise reduction image 21 is calculated as in Equation (8).

Thereafter, in second adaptive NR processing 39, a signal level r(x,y) after noise reduction for the ¼ reduced image 22 is calculated using Equations (13), (14), and (15). In second adaptive NR processing 39, instead of the original signal level g(x,y) in Equation (15), the signal level r(x,y) (the processing result of first adaptive NR processing 35) after noise reduction of the input image 20 is used.

Next, in determination processing 40, the local variance value $\sigma^2_{u4}(x,y)$ for a pixel of coordinates (x,y) of the ¼ reduced image 23 of the pre-noise reduction image 21 obtained in edge feature amount calculation processing 38 and the noise variance value $\sigma^2_{n16}(x,y)$ for the 1/16 reduced image 25 of the pre-noise reduction image 21 are compared with each other. As the noise variance value for the 1/16 reduced image 23, a value that is previously measured for each ISO sensitivity can be used as illustrated in FIG. 8. The noise variance value $\sigma^2_{n16}(x,y)$ may be a value that does not depend on coordinates (x,y) but depends on only the ISO sensitivity.

When the local variance value $\sigma^2_{u4}(x,y)$ of the ¼ reduced image 23 of the pre-noise reduction image 21 is the threshold value $\sigma^2_{n46}(x,y)$ or more, the luminance noise reduction processing unit 191 determines that there is a high possibility that the coordinates (x,y) correspond to an edge part. In this case, the luminance noise reduction processing unit 191 does not perform processing for the ¼ reduced image but performs mixing processing 44. When the local variance value $\sigma^2_{u4}(x,y)$ of the ¼ reduced image 23 of the pre-noise reduction image 21 is smaller than the threshold value $\sigma^2_{n16}(x,y)$, the luminance noise reduction processing unit 191 determines that there is a high possibility that the coordinates (x,y) correspond to a flat portion. This is because it is determined that a ratio which a frequency noise component that remains in the 1/16 reduced image 24 of the input image 20 occupies in the signal level of the local area of the ¼ reduced image 23 of the pre-noise reduction image 21 is high. In this case, the luminance noise reduction processing unit 191 performs adaptive mean value calculation processing 41 using the 1/16 reduced image 24 of the input image 20 and edge feature amount calculation processing 42 using the 1/16 reduced image 25 of the pre-noise reduction image 21.

In adaptive mean value calculation processing 41, two types of pixel averages ave9 and ave25 are calculated using the 1/16 reduced image 24 of the input image 20 as in Equations (11) and (12).

Further, in edge feature amount calculation processing 42, an edge feature amount p(x,y) for the 1/16 reduced image 25 of the pre-noise reduction image 21 is calculated as in Equation (8).

Thereafter, in third adaptive NR processing 43, a signal level r(x,y) after noise reduction for the 1/16 reduced image 24 is calculated using Equations (13), (14), and (15). In third adaptive NR processing 43, instead of the original signal level g(x,y) in Equation (15), the signal level r(x,y) (the processing result of second adaptive NR processing 39) after noise reduction of the ¼ reduced image 23 is used.

In mixing processing 44, the signal level g(x,y) of the input image 20 and the noise reduced image r(x,y) obtained from any of first adaptive NR processing 35, second adaptive NR processing 39, and third adaptive NR processing 43 are weighted-averaged according to the ISO sensitivity as in Equation (16). As a result, a final signal level nr(x,y) of the output image 26 after noise reduction is obtained.

$$nr(x, y) = (1 - ip(iso)) \cdot r(x, y) + ip(iso) \cdot g(x, y) \quad (16)$$

$$ip(iso) = 1.0 - M\max * \frac{ISO \text{ sensitivity}}{\text{Highest } ISO \text{ sensitivity}} \quad (17)$$

In Equation (17), Mmax denotes a predetermined coefficient, and for example, 0.7 may be set as Mmax.

According to Equations (16) and (17), as the ISO sensitivity of an image is higher, a value of ip(iso) is smaller, and the signal level g(x,y) of the input image 20 to the signal level r(x,y) of the output image after noise reduction is smaller. That is, as the ISO sensitivity is higher and an amplification rate of a noise to a signal level is larger, weighting of the signal level r(x,y) of the output image after noise reduction is larger. Therefore, a defect of a detail (a high frequency component of an image), which occurs since noise removal strength in a flat portion is too strong when only the signal level r(x,y) of the output image after noise reduction is used, can be inhibited.

When an image which is desired to be finally obtained is a reduced image in which a size is reduced, processing 37 and 38 using the ¼ reduced images 22 and 23 may be performed without performing processing 33 to 36 for an unmagnified image which requires processing time.

Further, mixing processing 44 may be omitted, and instead of Equations (15) and (16), Equation (18) may be used in each of adaptive NR processing 35, 39, and 43 to calculate the final signal level nr(x,y) of the output image 26 after noise reduction.

$$nr(x,y)=(1-p(x,y)*ip(iso)) \cdot E(g(x,y))+p(x,y)*ip(iso) \cdot g(x,y)i. \quad (18)$$

As can be seen from Equation (18), as the edge feature amount p(x,y) is larger or as the ISO sensitivity is smaller, a ratio of the original signal level g(x,y) to the local mean value E(g(x,y)) is larger, and thus a high frequency component of an image is easily maintained. On the other hand, as the edge feature amount p is smaller or as the ISO sensitivity is larger, a ratio of the local mean value E(g(x,y)) to the original signal level g(x,y) is larger, and thus a noise component is easily suppressed.

As a modification of the present exemplary embodiment, calculation of the edge feature amount p may be performed for only the pre-noise reduction image 21, which is not reduced in size, without generating a reduced image from the pre-noise reduction image 21. The processing content and flow of the luminance noise reduction processing unit 191 in this case is illustrated in FIG. 14.

Figure 14:
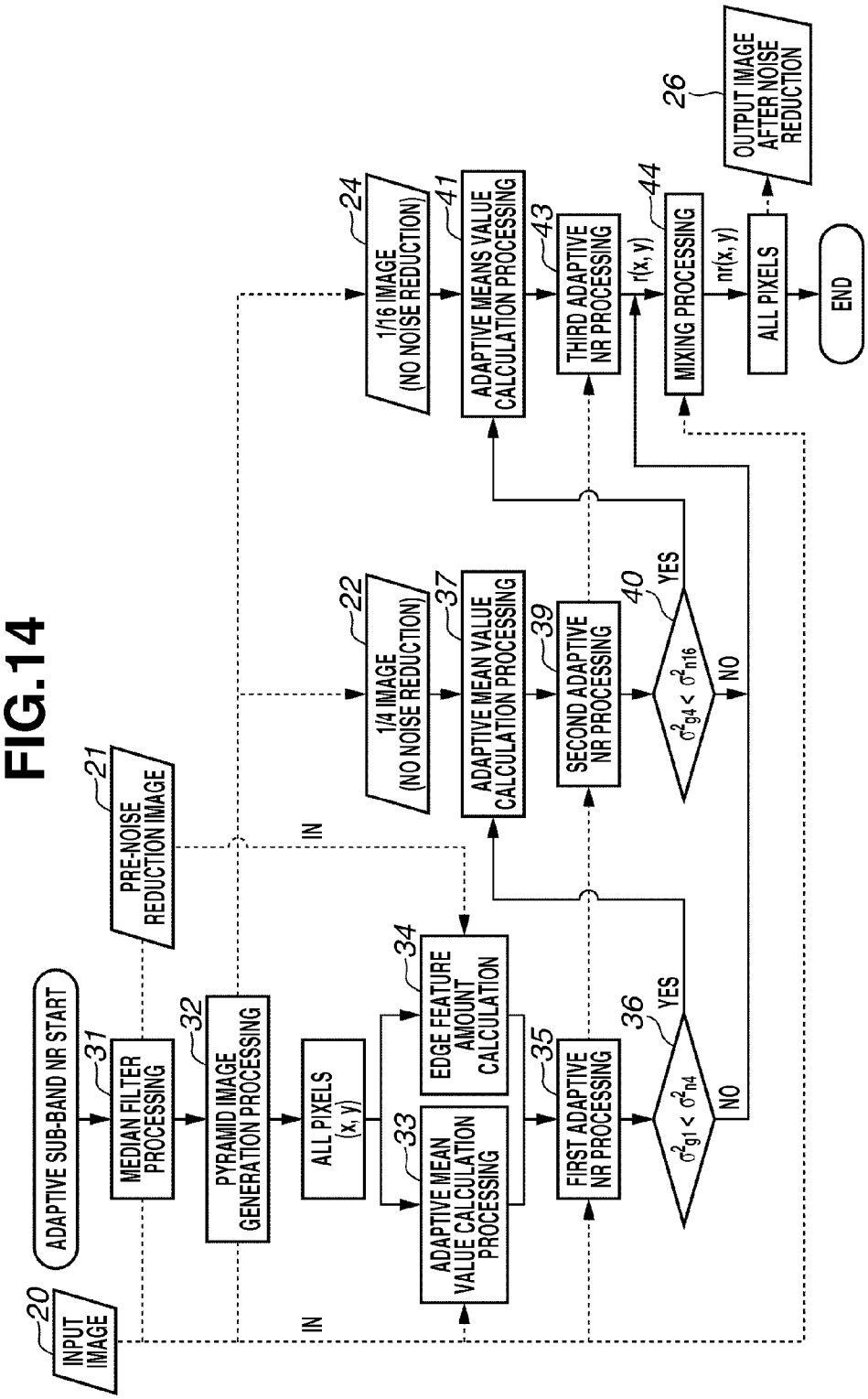
FIG. 14 illustrates another example of a processing content and flow of a luminance noise reduction processing unit of the image processing apparatus according to the second exemplary embodiment of the present invention.

In FIG. 14, the same reference numerals as in FIG. 12 denote the same parts as in FIG. 12, and duplicated description will not be repeated.

As apparent from a comparison of FIGS. 14 and 12, in pyramid image generation processing 32, a ¼ reduced image 22 and a ¹⁄₁₆ reduced image 24 are generated for only the input image 20, and a reduced image is not generated for the pre-noise reduction image 21.

In determination processing 36, the noise variance value $\sigma^2_{n4}(x,y)$ for the ¼ reduced image 22 of the input image 20 and the local variance value $\sigma^2_g(x,y)$ for coordinates (x,y) of the input image 20 are compared with each other.

The luminance noise reduction processing unit 191 determines that there is a high possibility that the coordinates (x,y) correspond to an edge part when the local variance value $\sigma^2_g(x,y)$ for coordinates (x,y) of the input image 20 is the threshold value $\sigma^2_{n4}(x,y)$ or more. In this case, the luminance noise reduction processing unit 191 does not perform processing for the ¼ reduced image but immediately performs mixing processing 44. However, when the local variance value $\sigma^2_g(x,y)$ for coordinates (x,y) of the input image 20 is smaller than the threshold value $\sigma^2_{n4}(x,y)$, the luminance noise reduction processing unit 191 determines that there is a high possibility that the coordinates (x,y) correspond to a flat portion. This is because the local variance value $\sigma^2_g(x,y)$ of the input image 20 being smaller than the threshold value $\sigma^2_{n4}(x,y)$ means that a ratio which a frequency noise component that remains in the ¼ reduced image 22 of the input image 20 occupies in the signal level of the local area of the input image 20 is high. In this case, the luminance noise reduction processing unit 191 performs adaptive mean value calculation processing 37 using the ¼ reduced image 22 of the input image 20.

In determination processing 40, the noise variance value $\sigma^2_{n16}(x,y)$ for the ¹⁄₁₆ reduced image 24 of the input image 20 and the local variance value $\sigma^2_{g4}(x,y)$ for coordinates (x,y) of the ¼ reduced image 22 of the input image 20 are compared with each other.

When the local variance value $\sigma^2_{g4}(x,y)$ for coordinates (x,y) of the ¼ reduced image 22 of the input image 20 is the threshold value $\sigma^2_{n16}(x,y)$ or more, the luminance noise reduction processing unit 191 determines that there is a high possibility that the coordinates (x,y) correspond to an edge part. In this case, the luminance noise reduction processing unit 191 does not perform processing for the ¹⁄₁₆ reduced image but performs mixing processing 44. However, when the local variance value $\sigma^2_{g4}(x,y)$ of coordinates (x,y) of the ¼ reduced image 22 of the input image 20 is smaller than the threshold value $\sigma^2_{n16}(x,y)$, the luminance noise reduction processing unit 191 determines that there is a high possibility that the coordinates (x,y) correspond to a flat portion. This is because it is determined that a ratio which a frequency noise component that remains in the ¹⁄₁₆ reduced image 24 of the input image 20 occupies in the signal level of the local area of the ¼ reduced image 22 of the input image 20 is high. In this case, the luminance noise reduction processing unit 191 performs adaptive mean value calculation processing 41 using the ¹⁄₁₆ reduced image 24 of the input image 20.

As the noise variance values, values that are previously measured for each ISO sensitivity can be used as illustrated in FIG. 8. The local variance value $\sigma^2_g(x,y)$ and $\sigma^2_{g4}(x,y)$ for coordinates (x,y) of the input image 20 and the ¼ reduced image 22 can be calculated using Equations (9) and (10) in the same way as the local variance value $\sigma^2_n(x,y)$ of the pre-noise reduction image.

As the feature amount p used in adaptive NR processing 39 and adaptive NR processing 43 for the reduced image, a value for a corresponding pixel out of the feature amounts p that are obtained through edge feature amount calculation processing 34 for the pre-noise reduction image 21 is used.

With the above-described configuration, a load required in processing of generating a reduced image of a low resolution or processing of obtaining an edge feature amount for a reduced image can be removed. Therefore, processing time can be reduced.

Adaptive mean value calculation processing 33, 37, and 41 can be executed through a single adaptive mean value calculation processing circuit within the image processing unit 525. Similarly, edge feature amount calculation processing 34, 38, and 42 can be executed through a single edge feature amount calculation processing circuit within the image processing unit 525. Similarly, first adaptive NR processing 35, second adaptive NR processing 39, and third adaptive NR processing 43 can be executed through a single adaptive NR processing circuit within the image processing unit 525. Determination processing 36 and 40 can be executed through a single determination processing circuit within the image processing unit 525.

Next, a third exemplary embodiment of the present invention will be described.

In the flow of image processing performed by the image processing unit 804 (an image processing application performed by the information processing apparatus 600) described with reference to FIG. 6, processing by the color interpolation processing unit 140 and the luminance noise reduction processing unit 191 requires relatively long processing time. Therefore, processing by the color interpolation processing unit 140 and the luminance noise reduction processing unit 191 may be performed as early as possible in the flow of image processing illustrated in FIG. 6.

When correction processing for a certain image deterioration cause is sequentially performed over a plurality of image deterioration factors, correction processing may be performed in an order opposite to an order in which an image deterioration cause happens or that correction processing may do not affect things other than an image deterioration cause to be corrected.

For example, an image noise is usually generated in a photoelectric conversion process of an image sensor, transmission of an analog signal, and an amplification process of an analog signal, and does not relate to light falloff at edges or chromatic aberration of magnification, caused by the lens 501, which is a correction target of the lens correction processing unit 120. However, a noise characteristic of an image changes under the influence of correction processing for light falloff at edges. Therefore, when the correction processing for light falloff at edges is performed before noise reduction processing, in noise reduction processing based on the noise variance value described above, a noise of a peripheral part of an image in which light falloff at edges is corrected may be determined as an edge area. In this case, even though a lot of noises are actually present, an effect of noise reduction processing is reduced. Therefore, noise reduction processing may be performed earlier than other correction processing that affects a noise characteristic.

Figure 15:
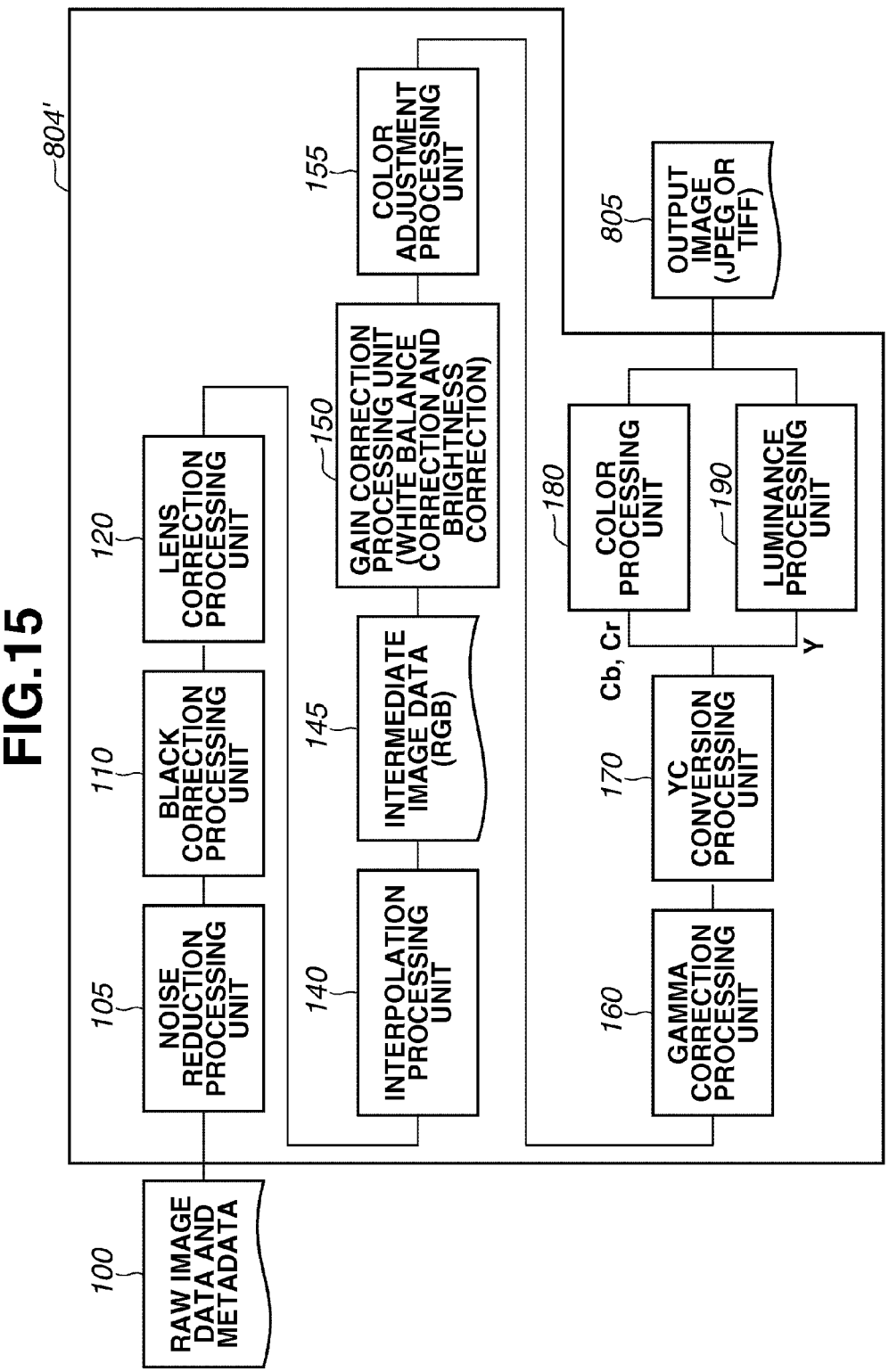
FIG. 15 illustrates a processing content and flow of an image processing unit of an image processing apparatus according to a third exemplary embodiment of the present invention.

Therefore, in the present exemplary embodiment, the noise reduction processing unit 105 is located ahead of the lens correction processing unit 120 as illustrated in FIG. 15, so that noise reduction processing is performed earlier than lens correction processing.

Figure 16:
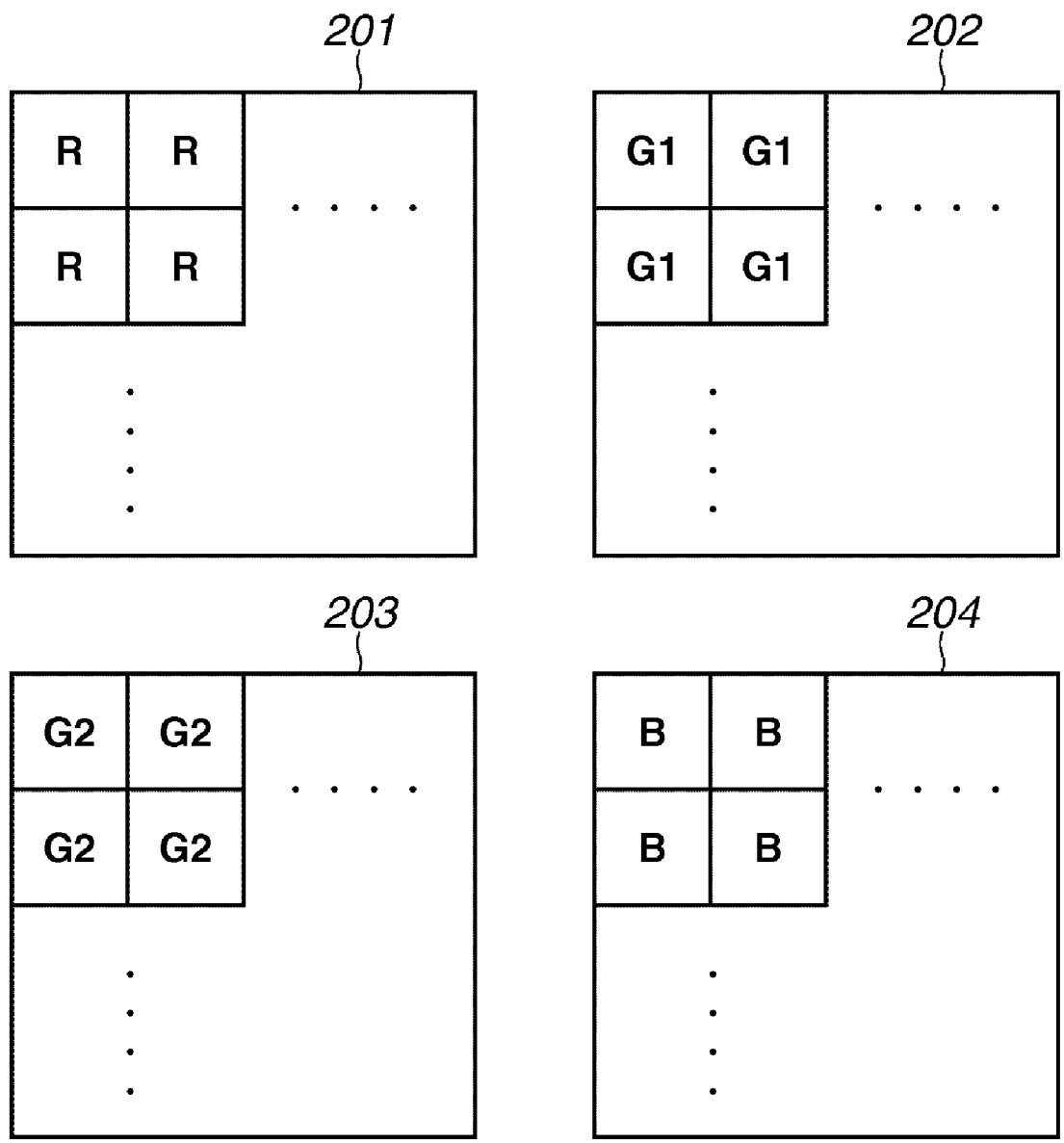
FIG. 16 illustrates an example configuration of an input image in the image processing apparatus according to the third exemplary embodiment of the present invention.
Figure 17:
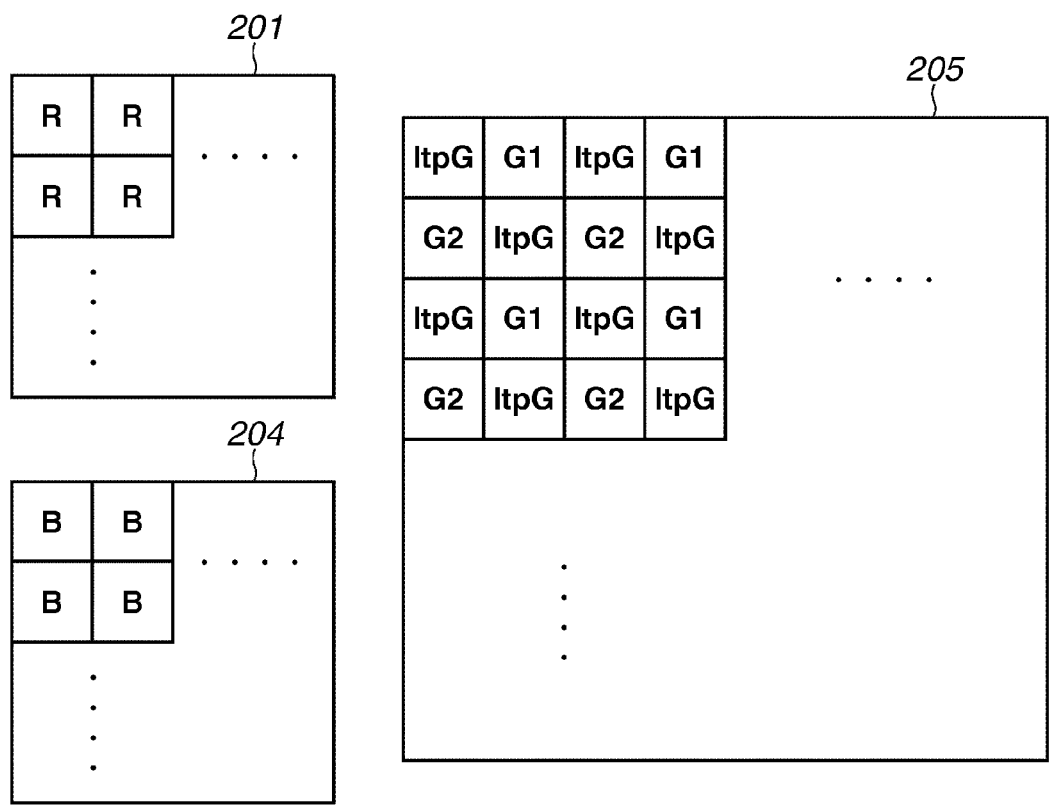
FIG. 17 illustrates an another example configuration of an input image in the image processing apparatus according to the third exemplary embodiment of the present invention.

The noise reduction processing unit 105 illustrated in FIG. 15 applies luminance noise reduction processing illustrated in the first exemplary embodiment for each image formed by pixels of the same color according to a configuration of a color filter disposed in an image sensor. For example, when an image sensor having a color filter of the Bayer array is used, luminance noise reduction processing described above can be applied to four images (201, 202, 203, and 204) including pixels of the same type with a pixel array of R, G1, G2, and B, respectively, as illustrated in FIG. 16. Alternatively, as illustrated in FIG. 17, luminance noise reduction processing described above may be applied to three images (201, 205, and 204) without dividing green pixels into a pixel G1 and a pixel G2. In FIG. 17, a pixel (ItpG) between the pixel G1 and the pixel G2 is generated from neighboring pixels through interpolation.

As described above, in the present exemplary embodiment, noise reduction processing is performed earlier than other correction processing that affects a noise characteristic, so that a noise can be effectively reduced.

Next, a fourth exemplary embodiment of the present invention will be described.

The exemplary embodiments of the present invention have been described focusing on an example in which RAW image data picked up by a digital camera is applied to an image processing application that processes RAW image data. There are digital cameras that are capable of recording an image in both RAW format and JPEG format. In particular digital cameras, when the RAW image data is generated, image data in JPEG format may be included in a header to be used as a preview image.

As described above, when image data in RAW format and image data in a different format (e.g., JPEG format) are present for the same image, there is a case in which it is expected that the same processing will be performed for each image data in the image processing application. In this case, to obtain the same noise reduction effect for images in both formats, the same noise reduction processing may be applied.

To be further exact, noise reduction processing methods may be identical, and due to the reason described in the third exemplary embodiment, at which position out of a plurality of image processing procedures noise reduction processing is performed may be identical.

Figure 18:
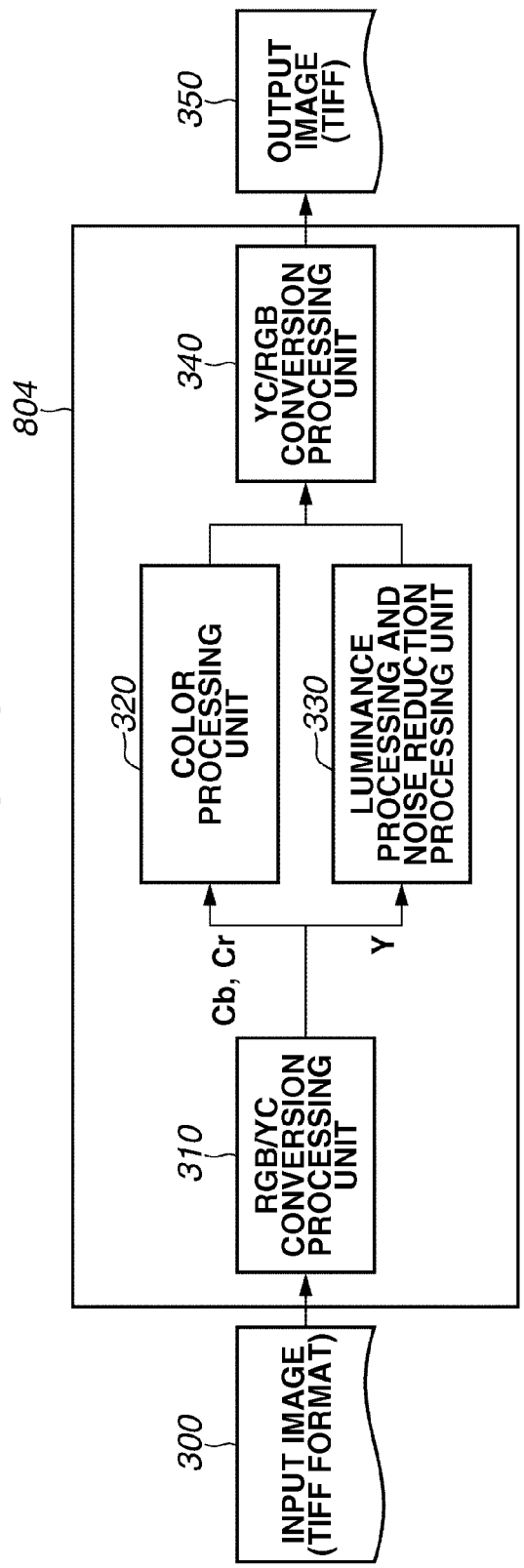
FIG. 18 illustrates a sequence example when noise reduction processing for image data (RGB image) in TIFF format is performed in an image processing apparatus according to a fourth exemplary embodiment of the present invention.
Figure 19:
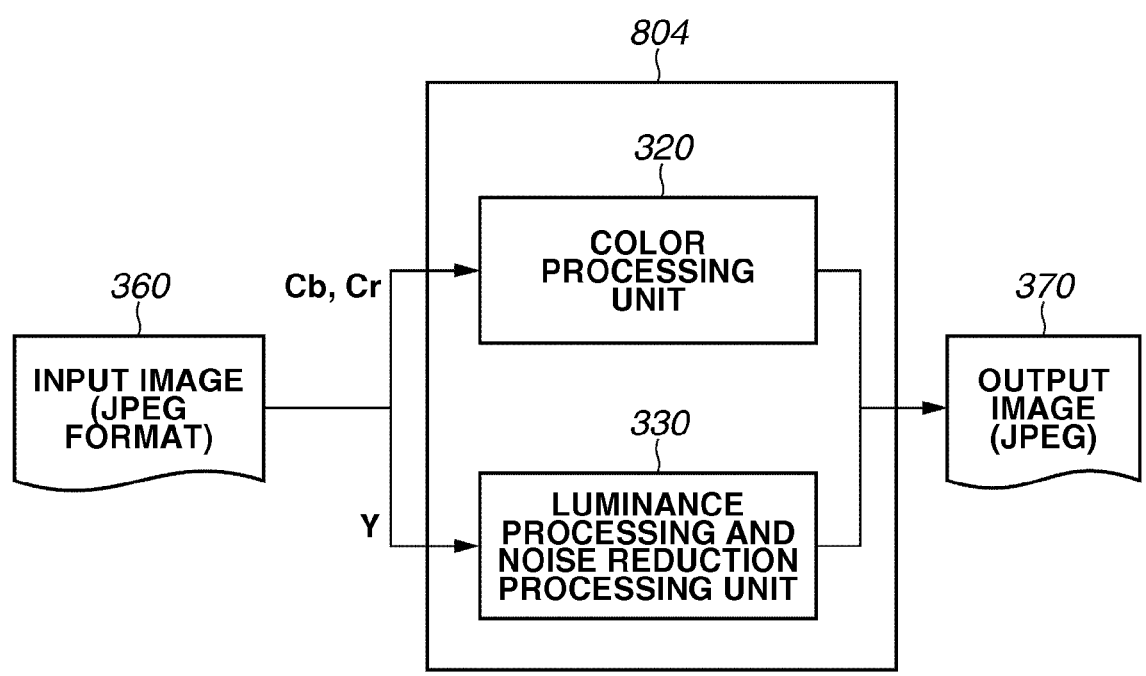
FIG. 19 illustrates a sequence example when noise reduction processing for image data (YC image) in JPEG format is performed in the image processing apparatus according to the fourth exemplary embodiment of the present invention.

For example, noise reduction processing described in the first exemplary embodiment or the second exemplary embodiment may be performed in processes illustrated in FIGS. 6, 18, and 19. FIG. 6 illustrates the processing flow when noise reduction processing for RAW image data is performed as described in the first exemplary embodiment. FIG. 18 illustrates a sequence example when noise reduction processing for image data (RGB image) in TIFF format is performed, and FIG. 19 illustrates a sequence example when noise reduction processing for image data (YC image) in JPEG format is performed. In all cases, noise reduction processing is applied to luminance data.

In FIG. 18, since a signal level of an input image 300 (image data in TIFF format) is represented by RGB, an RGB/YC conversion processing unit 310 converts the input image 300 into a luminance component and a color difference component. A luminance processing and noise reduction processing unit 330 applies noise emphasis processing and luminance noise reduction processing described above to the luminance component. The color processing unit 320 performs false color suppression processing for the color difference component. A YC/RGB conversion processing unit 340 performs conversion again into RGB components and outputs image data in TIFF format after noise reduction as an output image 350.

In FIG. 19, an input image 360 (image data in JPEG format) is divided into a luminance component and a color difference component in advance. Therefore, processing by the color processing unit 320 and the luminance processing and noise reduction processing unit 330 is immediately performed, and image data in JPEG format after noise reduction is output as an output image 370. Further, even though not illustrated in FIG. 19, decoding of the input image and re-encoding after noise reduction are actually performed.

A noise variance value used in this case, that is, a noise characteristic of a sensor, changes depending on a shooting condition (for example, the ISO sensitivity) and an image processing content (for example, a white balance gain and a gamma curve) as in Equation (19). When a shooting condition or an image processing content is obtained from metadata included in a header of an image file, a variance value, which is a feature of a noise, is determined according to which image processing has been performed until noise reduction processing is performed.

Equation (19) is a calculation example in the case of calculating a noise variance value (a standard deviation $\sigma_{n2}(x,y)$) when luminance noise reduction processing described above is applied to an image in which gamma correction has been performed through the gamma correction processing unit 160 after gain correction through the gain correction processing unit 150 as illustrated in FIG. 6.

In Equation (19), $\sigma_{n2}(x,y)$ is calculated such that a standard deviation $\sigma_n(x,y)$ of a noise at the time of inputting RAW image data is multiplied by a white balance gain and a brightness adjustment gain, and then a gamma curve ($\gamma$) is applied.

$$\sigma_{n2}(x,y)=\gamma(gain \times \sigma_n(x,y)) \quad (19)$$

As a noise variance, a value obtained by squaring the standard deviation $\sigma_{n2}(x,y)$ obtained in Equation (19) can be used.

As described above, according to the present exemplary embodiment, since the same noise reduction processing is applied to image data of different formats, the same noise reduction processing result can be obtained for image data which have different data formats in the same image.

Next, a fifth exemplary embodiment of the present invention will be described.

In the fourth exemplary embodiment, shooting condition information and image processing content information are obtained from metadata included in a header of an image file, and noise reduction processing is performed using a noise variance value depending on the information.

However, the information may not be acquired from an image file. When noise reduction processing for a JPEG image or a TIFF image in which a shooting condition or an image processing content is unknown is performed, it is difficult to estimate a noise characteristic included in an image in advance. Therefore, in the present exemplary embodiment, a noise characteristic is estimated from image data.

A noise characteristic can be estimated, based on the fact that a noise characteristic of an output image of a digital camera depends on a gray gradation value, such that a gray flat portion is searched from an image, and a gradation value and a standard deviation are obtained for each of R, G, and B in the gray flat portion.

Figure 20:
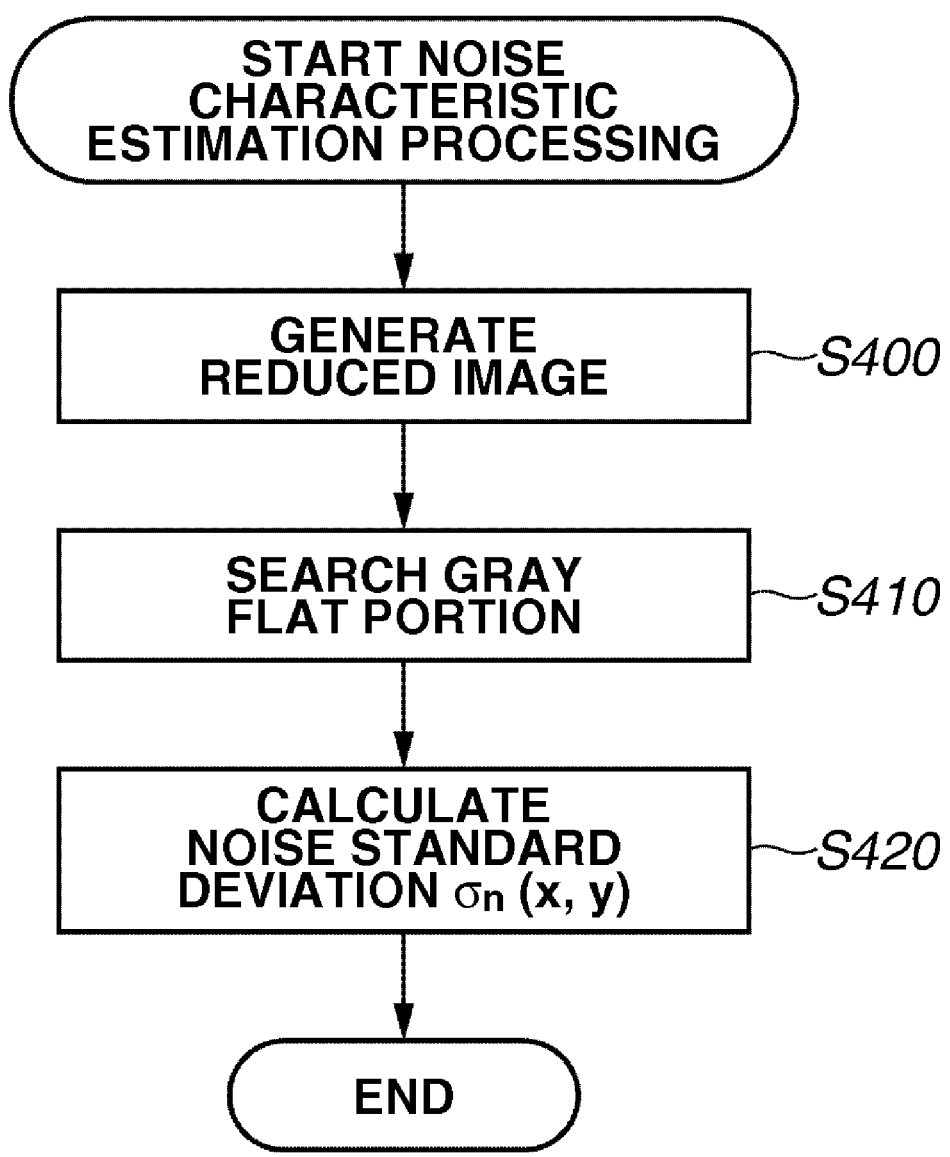
FIG. 20 is a flowchart illustrating a noise characteristic estimation processing content performed by an image processing unit in the image processing apparatus according to a fifth exemplary embodiment of the present invention.

FIG. 20 is a flowchart illustrating a content of a noise characteristic estimation processing content performed by the image processing unit 804 according to the present exemplary embodiment.

In step S400, the image processing unit 804 generates a reduced image from an input image. This step is performed to avoid influence from a detailed texture or an impulse noise and obtain a flat portion at high speed. As the input image, a pre-noise reduction image may be used.

Figure 21:
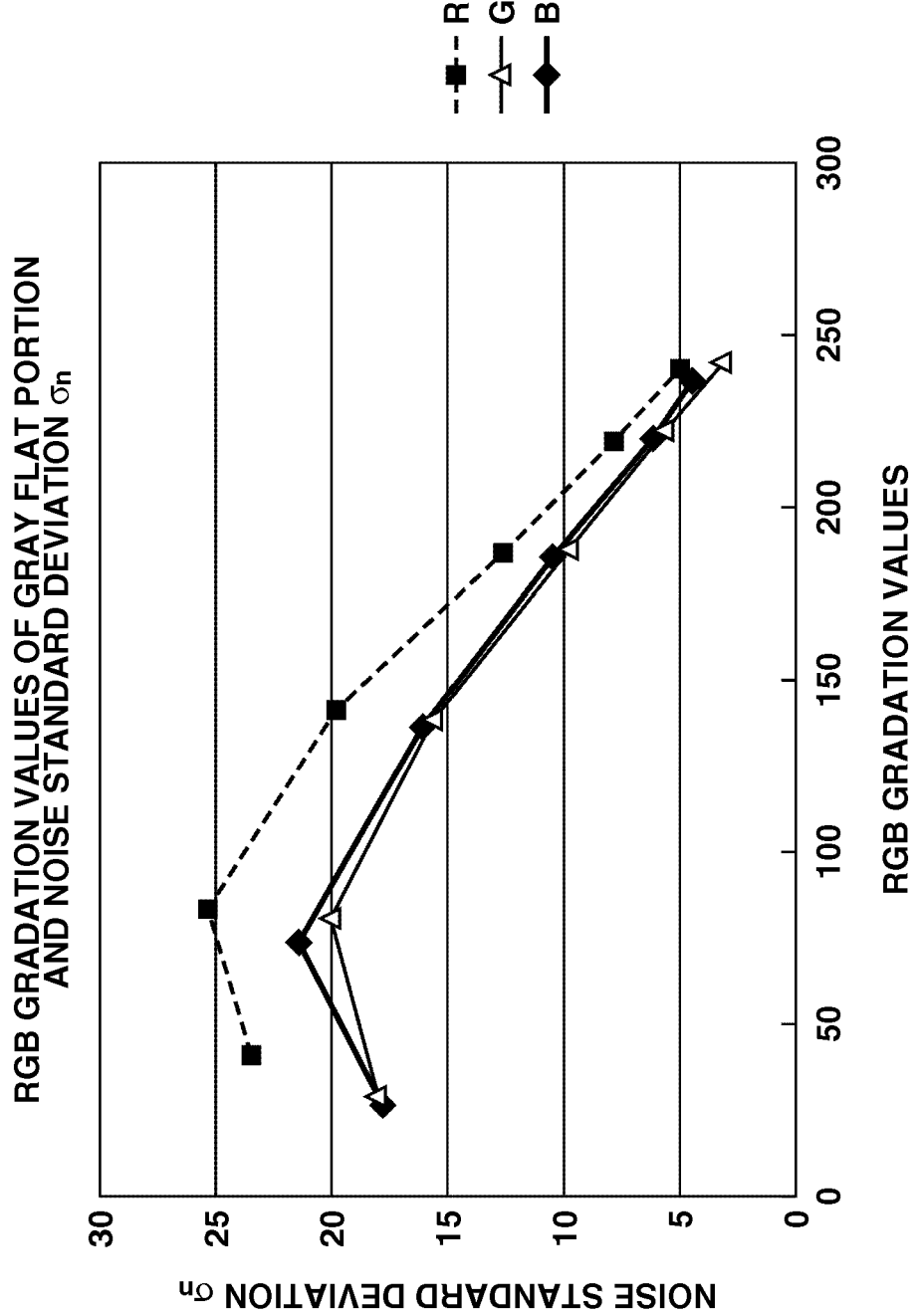
FIG. 21 illustrates a relationship example of R, G, and B gradation values of a gray flat portion and standard deviations of R, G, and B.

In step S410, the image processing unit 804 searches for a gray flat portion in the reduced image. In step S420, the image processing unit 804 obtains a noise standard deviation $\sigma_n(x,y)$ from the searched gray flat portion as an estimation noise characteristic. For example, the image processing unit 804 obtains the noise standard deviation of each of R, G, and B from the R, G, and B gradation values of the gray flat portion using a relationship illustrated in FIG. 21. The image processing unit 804 obtains a noise variance value from the noise standard deviation $\sigma_n(x,y)$. The luminance noise reduction processing unit 191 uses the noise variance value in luminance noise reduction processing for an R image, a G image, and a B image.

Since the standard deviation is obtained from the reduced image, the standard deviation is smaller than a value that is obtained from an image before reduction. Therefore, the noise variance value is obtained from the standard deviation in view of a relationship of a characteristic of a low pass filter and a change of a standard deviation that are used to generate the reduce image in step S400. To this end, how the noise variance value changes to the low pass filter used for generating the reduced image can be investigated through actual measurement in advance. Alternatively, a spatial frequency characteristic of a noise is assumed, and a noise change by the low pass filter can be estimated by a frequency response of the low pass filter.

Figure 22:
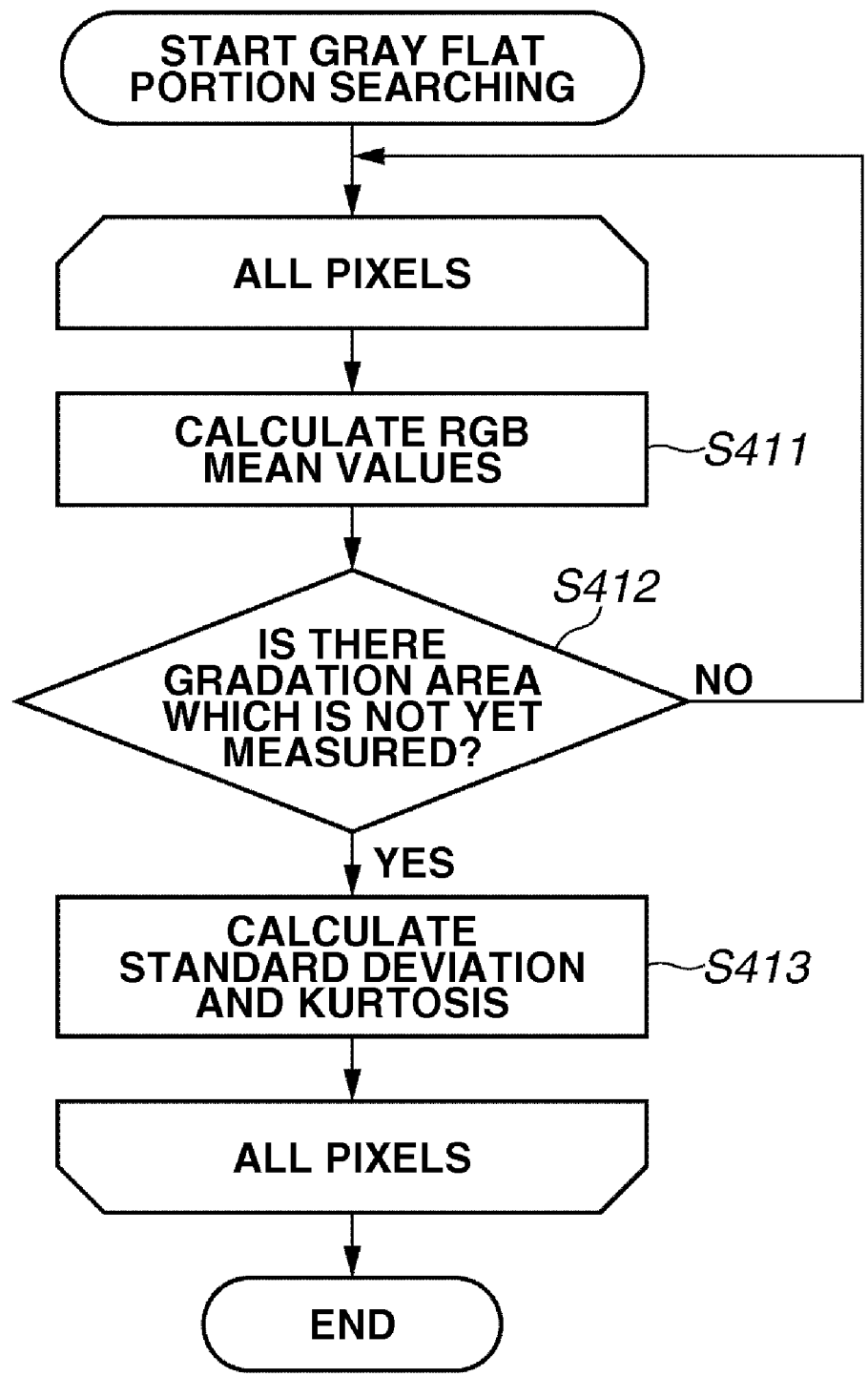
FIG. 22 is a flowchart illustrating gray flat portion search processing performed in step S410 of FIG. 20 in detail.

FIG. 22 is a flowchart illustrating gray flat portion search processing performed in step S410 of FIG. 20 in detail.

In steps S411 and S412, the image processing unit 804 calculates a mean value of R, G, and B in, for example, a kernel of 7×7 taps. In step S413, the image processing unit 804 calculates a variance value (or a standard deviation) and a kurtosis of the calculated mean value. When the mean value of R, G, and B is within a predetermined range and the kurtosis is within a predetermined range, the kernel (area) is determined as a gray flat portion. Since calculation for obtaining the variation value or the kurtosis requires time, calculation may not be performed for an area in which information of a gradation area necessary for noise estimation cannot be obtained.

As described above, according to the present exemplary embodiment, since a noise characteristic is estimated from an image, even when information necessary for noise estimation cannot be obtained from metadata (attribute information) of an image file, appropriate noise reduction processing can be performed.

In the exemplary embodiments described above, noise reduction processing is performed in the information processing apparatus, but similar noise reduction processing can be applied to an imaging apparatus. In this case, noise reduction processing can be performed in the luminance processing circuit illustrated in FIG. 2.

The above-described exemplary embodiments can be implemented in software by a computer (or CPU or micro processing unit (MPU)) of a system or an apparatus.

Therefore, a computer program supplied to the computer to implement the exemplary embodiments described above also implements the present invention. That is, a computer program for implementing functions according to the exemplary embodiments described above is within the scope of the present invention.

A computer program for implementing the exemplary embodiments described above can have any computer-readable form. For example, the computer program can be configured by, but is not limited to, object code, a program executed by an interpreter, or script data supplied to an OS.

The computer program for implementing the exemplary embodiments described above is supplied to a computer via a storage medium or a wired/wireless communication. Examples of a storage medium for supplying the program include a floppy disk, a hard disk, a magnetic storage medium such as a magnetic tape, an optical/magneto-optical storage medium such as a magneto optic (MO) disc, a compact disc (CD), and a digital versatile disc (DVD), and a non-volatile semiconductor memory.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
a reduced image generation unit configured to generate a reduced image of an input image;
a noise reduction unit configured to generate a first pre-noise reduction image obtained by reducing an impulse noise of the input image, and to generate a second pre-noise reduction image obtained by reducing the impulse noise of the reduced image;
a smoothing unit configured to calculate a first smoothed value obtained by smoothing signal levels of a plurality of pixels including a processing target pixel in a local area of the input image, and to calculate a second smoothed value obtained by smoothing signal levels of a plurality of pixels including the processing target pixel in a local area of the reduced image;
a feature amount calculation unit configured to calculate a first feature amount representing an edge degree of the processing target pixel using the first pre-noise reduction image, and to calculate a second feature amount representing an edge degree of the processing target pixel using the first pre-noise reduction image or the second pre-noise reduction image;
an addition unit configured to weighted-add a signal level of the processing target pixel of the input image and the first smoothed value at a ratio corresponding to the first feature amount in order to output the weighted addition result as a signal level after noise reduction processing of the input image, and to weighted-adds a signal level of the processing target pixel of the reduced image and the second smoothed value at a ratio corresponding to the second feature amount in order to output the weighted addition result as a signal level after noise reduction processing of the reduced image; and
a selection unit configured to select and output one of the signal level after noise reduction processing of the input image and the signal level after noise reduction processing of the reduced image according to a variance value of signal levels of the input image or a variance of signal levels of the first pre-noise reduction image of the input image,
wherein the addition unit performs the weighted addition such that as a pixel has a feature amount that represents a higher edge degree, a ratio of the smoothed value decreases.

2. The image processing apparatus according to claim 1, wherein the selection unit selects and outputs the signal level after noise reduction processing of the input image when the variance value of signal levels of the input image is a threshold value or more, and selects and outputs the signal level after noise reduction processing of the reduced image when the variance value of signal levels of the input image is smaller than the threshold value or selects and outputs the signal level after noise reduction processing of the input image when the variance value of the first pre-noise reduction image of the input image is a threshold value or more, and selects and outputs the signal level after noise reduction processing of the reduced image when the variance value of the first pre-noise reduction image of the input image is smaller than the threshold value.

3. The image processing apparatus according to claim 2, wherein the threshold value is a variance value of noises included in the signal level of the reduced image.

4. The image processing apparatus according to claim 3, further comprising a mixing processing unit configured to weighted-add the signal level output from the selection unit and a signal level of the input image and to output a signal level of the weighted-addition result.

5. The image processing apparatus according to claim 4, wherein the mixing processing unit performs a weighted addition such that as a sensitivity set in an imaging apparatus when the input image is captured is higher, a ratio of the signal level output from the selection unit is higher.

6. The image processing apparatus according to claim 1, wherein the first feature amount calculation unit calculates the first feature amount using a variance value of signal levels of a plurality of pixels including a processing target pixel in a local area of the first pre-noise reduction image and a variance value of noises of the first pre-noise reduction image, and
wherein as a ratio of the variance value of the signal levels to the variance value of noises increases, the edge degree represented by the feature amount increases.

7. An image processing method comprising:
generating a reduced image of an input image;
generating a first pre-noise reduction image obtained by reducing an impulse noise of the input image;
generating a second pre-noise reduction image obtained by reducing an impulse noise of the reduced image;
calculating a first smoothed value obtained by smoothing signal levels of a plurality of pixels including a processing target pixel in a local area of the input image;
calculating a second smoothed value obtained by smoothing signal levels of a plurality of pixels including a processing target pixel in a local area of the reduced image;
calculating a first feature amount representing an edge degree of the processing target pixel using the first pre-noise reduction image;
calculating a second feature amount representing an edge degree of the processing target pixel using the first pre-noise reduction image or the second pre-noise reduction image; and
weighted-adding a signal level of the processing target pixel of the input image and the first smoothed value at a ratio corresponding to the first feature amount and outputting the weighted addition result as a signal level after noise reduction processing of the input image,
weighted-adding a signal level of the processing target pixel of the reduced image and the second smoothed value at a ratio corresponding to the second feature amount and outputting the weighted addition result as a signal level after noise reduction processing of the reduced image,
selecting and outputting one of the signal level after noise reduction processing of the input image and the signal level after noise reduction processing of the reduced image according to a variance value of signal levels of the input image or a variance of signal levels of the first pre-noise reduction image of the input image,
wherein in weighted-adding the signal level, as a pixel has a feature amount that represents a higher edge degree, a ratio of the smoothed value decreases.

8. A non-transitory computer-readable medium storing a program that, when executed by a computer, causes the computer to perform a method, the method comprising the steps of:
generating a reduced image of an input image;

generating a first pre-noise reduction image obtained by reducing an impulse noise of the input image;

generating a second pre-noise reduction image obtained by reducing an impulse noise of the reduced image;

calculating a first smoothed value obtained by smoothing signal levels of a plurality of pixels including a processing target pixel in a local area of the input image;

calculating a second smoothed value obtained by smoothing signal levels of a plurality of pixels including a processing target pixel in a local area of the reduced image;

calculating a first feature amount representing an edge degree of the processing target pixel using the first pre-noise reduction image;

calculating a second feature amount representing an edge degree of the processing target pixel using the first pre-noise reduction image or the second pre-noise reduction image; and weighted-adding a signal level of the processing target pixel of the input image and the first smoothed value at a ratio corresponding to the first feature amount and outputting the weighted addition result as a signal level after noise reduction processing of the input image, weighted-adding a signal level of the processing target pixel of the reduced image and the second smoothed value at a ratio corresponding to the second feature amount and outputting the weighted addition result as a signal level after noise reduction processing of the reduced image, selecting and outputting one of the signal level after noise reduction processing of the input image and the signal level after noise reduction processing of the reduced image according to a variance value of signal levels of the input image or a variance of signal levels of the first pre-noise reduction image of the input image, wherein in weighted-adding the signal level, as a pixel has a feature amount that represents a higher edge degree, a ratio of the smoothed value decreases.

* * * * *